(12) United States Patent
Campbell et al.

(10) Patent No.: US 10,563,727 B2
(45) Date of Patent: Feb. 18, 2020

(54) CONTROLLED TRANSLATION METHOD OF AFFIXING A TERMINATION TO A TENSILE MEMBER

(71) Applicants: Richard V. Campbell, Havana, FL (US); David M Gladwin, Havana, FL (US)

(72) Inventors: Richard V. Campbell, Havana, FL (US); David M Gladwin, Havana, FL (US)

(73) Assignee: Bright Technologies, LLC, Havana, FL (US)

( * ) Notice: Subject to any disclaimer, the term of this patent is extended or adjusted under 35 U.S.C. 154(b) by 0 days.

(21) Appl. No.: 16/154,346

(22) Filed: Oct. 8, 2018

(65) Prior Publication Data
US 2019/0178341 A1    Jun. 13, 2019

Related U.S. Application Data

(63) Continuation-in-part of application No. 15/838,457, filed on Dec. 12, 2017.

(51) Int. Cl.
*B32B 41/00* (2006.01)
*F16G 11/02* (2006.01)
(Continued)

(52) U.S. Cl.
CPC ............ *F16G 11/02* (2013.01); *B21F 9/00* (2013.01); *B21F 15/04* (2013.01); *B23P 11/005* (2013.01); *B66B 7/08* (2013.01); *B66D 1/34* (2013.01)

(58) Field of Classification Search
CPC ... B29C 66/97; B29C 66/9121; B29C 66/344; B29C 65/561; B29C 65/72;
(Continued)

(56) References Cited

U.S. PATENT DOCUMENTS

| 3,660,887 | A | * | 5/1972 | Davis | ................ | B29C 39/10 |
| | | | | | | 264/262 |
| 2003/0010966 | A1 | * | 1/2003 | Sjostedt | ................ | B32B 1/08 |
| | | | | | | 254/231 |

(Continued)

*Primary Examiner* — Michael N Orlando
*Assistant Examiner* — Joshel Rivera
(74) *Attorney, Agent, or Firm* — J. Wiley Horton

(57) ABSTRACT

A method for creating a termination by attaching some kind of fitting to the end of a tensile member such as a cable. The end fitting is provided with one or more internal cavities. Each cavity has a proximal portion that is adjacent to the area where the tensile member exits the fitting and a distal portion on its opposite end. A length of the tensile member's filaments is placed within this expanding cavity and infused with liquid potting compound. The method exploits the characteristic of a liquid potting compound as it transitions to a solid. Once the potting compound in at least a portion of the cavity has transitioned sufficiently to hold the filaments at a desired level, tension is placed on the tensile member and a small linear displacement may be imposed on the tensile member. This linear displacement tends to pull the filaments residing in the potting compound into better alignment and improve load sharing. The invention can be applied to single fittings having multiple cavities and to multiple fittings having only one cavity per fitting.

23 Claims, 37 Drawing Sheets

(51) Int. Cl.
  *B21F 15/04* (2006.01)
  *B21F 9/00* (2006.01)
  *B23P 11/00* (2006.01)
  *B66D 1/34* (2006.01)
  *B66B 7/08* (2006.01)

(58) Field of Classification Search
  CPC . B29C 66/91221; B29C 65/54; B29C 66/742; B29C 6/5344; B29C 65/7841; B29C 66/1286; B29C 66/12821; B29C 66/112; B29C 66/95; B29C 65/48; B29C 66/69; B29C 65/4815; B29C 65/1406; B29C 65/546; B29C 65/542; B29C 65/485; B29C 65/4845; B29C 65/4835; B29C 66/5344; F16G 11/00; B29L 2031/707
  USPC .............. 156/64, 66, 350, 351, 378, 379
  See application file for complete search history.

(56) References Cited

U.S. PATENT DOCUMENTS

| | | | |
|---|---|---|---|
| 2006/0096089 A1* | 5/2006 | Campbell | F16G 11/042 29/857 |
| 2018/0104810 A1* | 4/2018 | Campbell | B29C 65/00 |

* cited by examiner

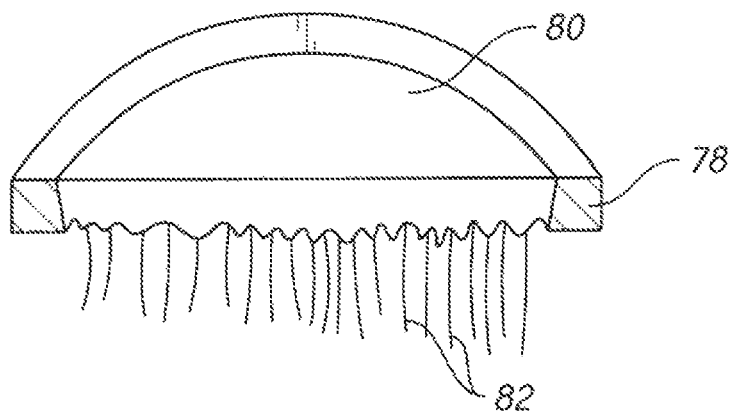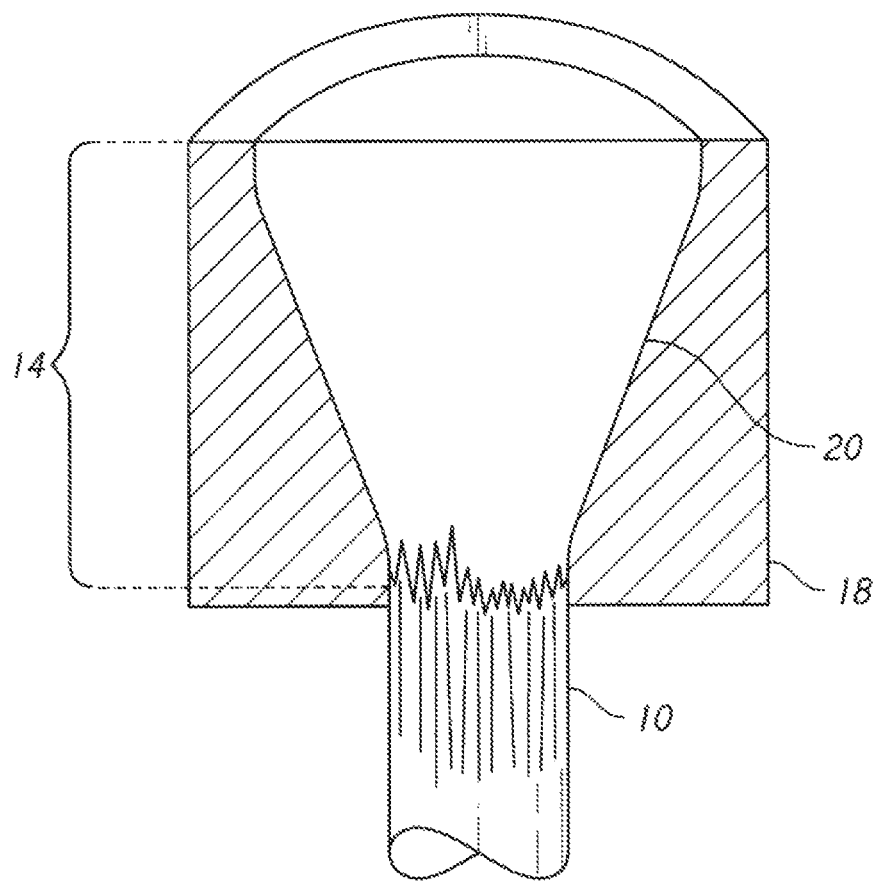
FIG. 16

CONTROLLED TRANSLATION METHOD OF AFFIXING A TERMINATION TO A TENSILE MEMBER

CROSS-REFERENCES TO RELATED APPLICATIONS

This non-provisional patent application is a continuation-in-part of application Ser. No. 15/838,457. The prior application listed the same inventors as the present application.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of tensile strength members. More specifically, the invention comprises a method for affixing a termination or terminations to an end of a tensile strength member such as a cable.

2. Description of the Related Art

Tensile strength members must generally be connected to other components in order to be useful. A flexible cable provides a good example. The cable must generally include some type of end-fitting so that it can be transmit a load. For example, a cable used in a hoist generally includes a lifting hook on its free end. This lifting hook may be rigged to a load. The assembly of an end-fitting and the portion of the cable to which it is attached is generally called a "termination."

A tough steel lifting hook is commonly attached to a wire rope to create a termination. A "spelter socket" is often used to create the termination. The "spelter socket" involves an expanding cavity within the end-fitting. A length of the wire rope is slipped into this cavity and the individual wires are splayed apart. A liquid potting compound is then introduced into the expanding cavity with the wires in place. The liquid potting compound transitions to a solid over time and thereby locks the wire rope into the cavity.

The potting compound used in a spelter socket is traditionally molten lead and—more recently—is more likely a high-strength epoxy. However, the term "potting compound" as used in this description means any substance which transitions from a liquid to a solid over time. Examples include molten lead, thermoplastics, and UV-cure or thermoset resins (such as two-part polyesters or epoxies). Other examples include plasters, ceramics, and cements. The term "solid" is by no means limited to an ordered crystalline structure such as found in most metals. In the context of this invention, the term "solid" means a state in which the material does not flow significantly under the influence of gravity. Thus, a soft but stable wax is yet another example of such a solid.

The prior art approaches to adding a termination are explained in detail in commonly-owned U.S. Pat. Nos. 7,237,336; 8,048,357; 8,236,219 and 8,371,015; which are hereby incorporated by reference. The prior art approaches are also explained in detail in commonly-owned U.S. patent application Ser. Nos. 13/678,664 and 15/710,692. These published pending applications are also hereby incorporated by reference. An exemplary termination is shown in FIGS. 1-4. FIG. 1 shows a cable 10 made from advanced high-strength synthetic filaments. Many different materials are used for these filaments. These include DYNEEMA (ultra-high-molecular-weight polyethylene), SPECTRA (ultra-high-molecular-weight polyethylene), TECHNORA (aramid), TWARON (p-phenylene terephthalamide), KEVLAR (para-aramid synthetic fiber), VECTRAN (a fiber spun from liquid-crystal polymer), PBO (poly(p-phenylene-2,6-benzobisoxazole)), carbon fiber, and glass fiber (among many others). In general the individual filaments have a thickness that is less than that of human hair. The filaments are very strong in tension, but they are not very rigid. They also tend to have low surface friction. These facts make such synthetic filaments difficult to handle during the process of adding a termination and difficult to organize. The present invention is particularly applicable to terminations made of such high-strength filaments, for reasons which will be explained in the descriptive text to follow. While the invention could in theory be applied to older cable technologies—such as wire rope—it likely would offer little advantage and the additional time and expense of implementing the invention would not be worthwhile. Thus, the invention is not really applicable to wire rope and other similar cables made of very stiff elements.

Those skilled in the art will know that cables made from synthetic filaments have a wide variety of constructions. The example shown in FIG. 1 has a parallel core of filaments surrounded by a jacket of braided filaments. In other cases the cable may be braided throughout. In still other examples the cable construction may be: (1) an entirely parallel construction enclosed in a jacket made of different material, (2) a helical "twist" construction, or (3) a more complex construction of multiple helices, multiple braids, or some combination of helices and braids.

In the example of FIG. 1, the objective is to attach anchor 18 to the end of a tensile strength member in order to create a termination that can then transmit a load. In this example the particular tensile strength member is in fact a cable. Throughout this disclosure cables will be used as an example of a tensile strength member. However the invention should not be viewed as being limited to cables. The term "tensile strength member" or "tensile member" encompasses cables and sub-components of cables such as strands. The reader is referred to commonly-owned U.S. Pat. No. 8,371,015 for more detailed descriptions regarding the application of an attachment to a sub-component of a larger cable. The reader is also referred to commonly-owned U.S. Pat. Nos. 8,371,015 and 9,835,228 regarding methods for terminating a multi-stranded cable and commonly-owned U.S. patent application Ser. Nos. 14/693,811 and 13/831,755 for the same. The invention also encompasses non-cable structures intended to carry loads in tension.

The reader should be aware that many terms are used inconsistently in the field of tensile strength members. As an example, the term "cable" is often used to refer to a flexible tensile strength member made of a helical winding of smaller components. The term "rope" is often used to refer to a tensile strength member having a braided or woven construction (rather than a helical construction). A common example of this inconsistency in terminology is "wire rope." Wire rope is made of a helical winding of steel wires. One might expect this configuration to be called a "cable"—and sometimes it is referred to that way—but more often it is just called "wire rope." In this disclosure the reader should not attach any particular significance to the use of the term "rope" or "cable."

Likewise, the term "anchor" should be viewed broadly to encompass virtually anything that can be attached to a rope or cable. A single anchor may be attached to the entire cable. In other cases an anchor may be attached to each strand (or other subgroup) of a cable so that a single end of a cable has multiple anchors. These multiple anchors are then typically gathered together by one or more additional components called collectors. An anchor ordinarily includes some feature or features facilitating attachment—such as a hook or a threaded shaft. These features are conventional and have not been illustrated in most of the disclosed embodiments. Anchor 18 is instead depicted in FIG. 1 in very simple terms as a simple cylinder with a cavity 20 passing along its central axis.

FIG. 2 shows a sectional view through anchor 18 with the cable in position for securing to the anchor (in this example a single anchor is attached to the entire cable). A length of the cable has been passed through cavity 20. The reader will note that cavity 20 expands as one proceeds from the portion of the anchor facing the length of cable (the "proximal" end, which is the bottom end in the orientation of the view) toward the portion of the anchor facing in the opposite direction (the "distal" end, which is the top end in the orientation of the view). The expanding cavity in this example is a linear taper between two straight portions—all joined by fillets. Differing wall profiles may be used to create a wide variety of expanding cavities.

A portion of the cable filaments are separated to create splayed filaments 12. Liquid potting compound is then introduced into cavity 20 via a wide variety of methods. These include: (1) "painting" or otherwise wetting the filaments with potting compound and then sliding the anchor into position over the painted filaments, (2) positioning the splayed filaments in the cavity and then pouring in potting compound, (3) pre-wetting the filaments in a separate mold designed to wet the filaments, and (4) injecting pressurized potting compound into the cavity. However the potting compound is introduced, the splayed filaments remain within cavity 20 while the potting compound hardens. Once it has hardened the result is a mechanical interlock between the filament-reinforced "plug" of solid material and the cavity. Tension applied to the cable will be transferred to the anchor via the mechanical interference.

The anchor applied will usually be permanent. However, it is also possible to apply a removable anchor such as a two-piece or dissolvable design that in itself forms a sort of mold. This can then be removed and another anchor device attached to the "molded" composite section of filaments and solidified potting compound. It is also possible to apply a one-piece removable anchor that is removed after the molding process by sliding it down the free end of the cable. As can be imagined by those skilled in the art, there are many ways in which this multi-step process could be devised to carry out the inventive method.

Of course, if enough tension is applied the termination will fail. Ideally failure would occur at 100% of the breaking stress of each individual termination. This would be a 100% efficient termination in which the termination hardware and method of termination did not detract from the performance potentially available in the filament material itself. In reality terminations fail below 100% of the filament strength and in some cases they fall far below it. FIGS. 3 and 4 serve to illustrate some of the reasons for this phenomenon.

FIG. 3 depicts a sectional view in which anchor 18 has been sectioned to reveal potted region 14 lying within the cavity in the anchor's interior. The cavity is defined by cavity wall 22—which is a profile revolved around central axis 24. It is not essential that the cavity be radially symmetric but most such cavities are radially symmetric. Proximal end 54 is the end of the anchor where the cable emerges. Distal end 56 is the opposite end.

The solid "plug" in potted region 14 may be conceptually divided into several regions. These are extended region 34, distal region 32, middle region 30, neck region 28, and transition region 26 (some terminations may be readily described using fewer regions and as few as only two—the distal region and the neck region). Transition region 26 represents the area where the freely-flexing filaments emerge from the potted region. Extended region 34 (which may not always be present) represents a region beyond the filaments that is 100% solidified potting compound. Distal region 32 represents the region containing filaments that is closest to the distal end of the anchor. The neck region contains filaments and is in the vicinity of the proximal end of the anchor. The behavior of these differing regions differs based on many factors, including: (1) the size of the cable, (2) the type of potting compound used, and (3) the temperature of the components during the transition of the potting compound to a solid.

FIG. 4 shows a depiction of filaments 38 as they lay locked within the solidified potting compound. This view illustrates one of the significant problems of the potting approach. Once the filaments are placed within the cavity in the anchor, it is very difficult to control their orientation with any specificity. The reader will note that the filaments are roughly arrayed about the anchor's central axis and roughly splayed into a fan. However, each individual filament tends to bend and slew in a random fashion. The random nature of this variance reduces the overall breaking strength of the termination and introduces variability in breaking strength from one termination to the next (since some will have better filament alignment than others).

The depiction of FIG. 4 shows only a few filaments for visual clarity. An actual cable may have several thousand to several million such filaments in the potted region. It is not possible to neatly arrange the filaments because there is no way to grip and hold them. One could conceptually improve the alignment by adding tension to the cable while the potting compound is still in a liquid state, but of course this action would simply pull the wetted filaments out of the anchor.

Another known problem is the difference in the filament-to-potting-compound ratio for different regions of the cavity. The distal extreme of the cavity tends to be rich in liquid potting compound and lean on filaments (liquid-rich region 40 in the view). The proximal extreme is just the opposite—packed with filaments with only a small amount of liquid compound seeping or wicking into the voids (liquid-lean region 42 in the view).

Most potting compounds are cross-linking polymers—such as epoxies. When the two constituents of such compounds are mixed an exothermic reaction is produced. The cross-linking rate is highly dependent upon temperature. To some extent the ultimate strength of the cross-linked solid is dependent upon temperature as well. Some heat is desirable but too much heat tends to produce short polymer-chain length.

Looking again at FIG. 4, those knowledgeable of exothermic reactions will perceive that the heating rate will vary within the potted region. In the liquid-rich region 40 the temperature will tend to rise more rapidly than in the liquid-lean region and the cross-linking will occur more rapidly (though the reader should note that for some potting compounds "rapid" may mean several hours up to a day or more). In the liquid-lean region 442 (typically the neck or transition regions), however, most of the volume is consumed by the filaments themselves. Only small "slivers" of potting compound are present and the heat of reaction in these slivers is largely absorbed in heating the filaments. Thus, the temperature in liquid-lean region rises slowly and the cross-linking process occurs slowly.

The local build-up of heat is not easily dissipated because the potting compounds and the filaments themselves tend to be good thermal insulators. This would not be true for a traditional cable made of wire filaments. Because steel is a good thermal conductor, traditional cables do not tend to create a significant temperature variation during the potting process.

Another phenomenon existing in the cure process is viscosity variation. This is particularly true for a cross-linking potting compound (though true to some extent for other compounds). When the liquid potting compound begins to heat up in a given area, its viscosity typically drops and it tends to ooze and fill voids more readily. In addition, the decreased viscosity allows the filaments to move more freely within the liquid potting compound. However, as the solid transition continues the viscosity rises and eventually rises a great deal. Thus, for many potting compounds, the viscosity at the initial stage will fall, then rise and solidification occurs.

The present invention seeks to exploit these existing phenomena and in some instances—where the phenomena do not arise naturally—the present invention seeks to create them.

BRIEF SUMMARY OF THE PRESENT INVENTION

The present invention comprises a method for creating a termination by attaching some kind of fitting to the end of a tensile strength member such as a synthetic filament cable or a strand thereof. The end fitting is provided with an internal cavity, which will often but not always be an expanding cavity. The cavity has a proximal portion that is adjacent to the area where the tensile member exits the fitting and a distal portion on its opposite end. A length of the tensile member's filaments is placed within this expanding cavity and infused with liquid potting compound. The method exploits the characteristic of a liquid potting compound as it transitions to a solid.

The transition of many types of potting compounds from a liquid to a solid occurs over a time period that may range from minutes to many hours. In the inventive method, the potting compound is monitored by various methods to determine when it has begun to transition from the purely liquid state. Once the potting compound has transitioned sufficiently tension is applied to the individual strands. Tension may also be applied to the cable as a whole, either as a substitute for applying tension to the individual strands or as a complement thereto. The tension applied during the solidification process tends to align the individual filaments and produce a small linear displacement that is approximately parallel to the tensile member's central axis. The result is an improvement in filament alignment and filament-to-filament load distribution. When applied to the cable as a whole, the tension has the additional benefit of balancing the load between the primary strands of the cable. These improvements produce an increase in the ultimate tensile strength of the termination, among other thing.

In the present invention the appropriate condition of the potting compound for the application of tension is determined. A preferable method is to determine this condition by the passage of time itself rather than monitoring any specific value such as temperature or viscosity (though the monitoring of these and other values may be employed as an additional refinement). In order to use the passage of time as the determining factor, it is advantageous to control the initial conditions. Tension and or a translated position is preferably maintained while the potting compound transitions completely to a solid. A rotational motion may be imposed on the tensile member as well.

BRIEF DESCRIPTION OF THE SEVERAL VIEWS OF THE DRAWINGS

FIG. 16 is a sectional perspective view, showing a completed anchor made using the technique shown in FIG. 15.

Figure 1:
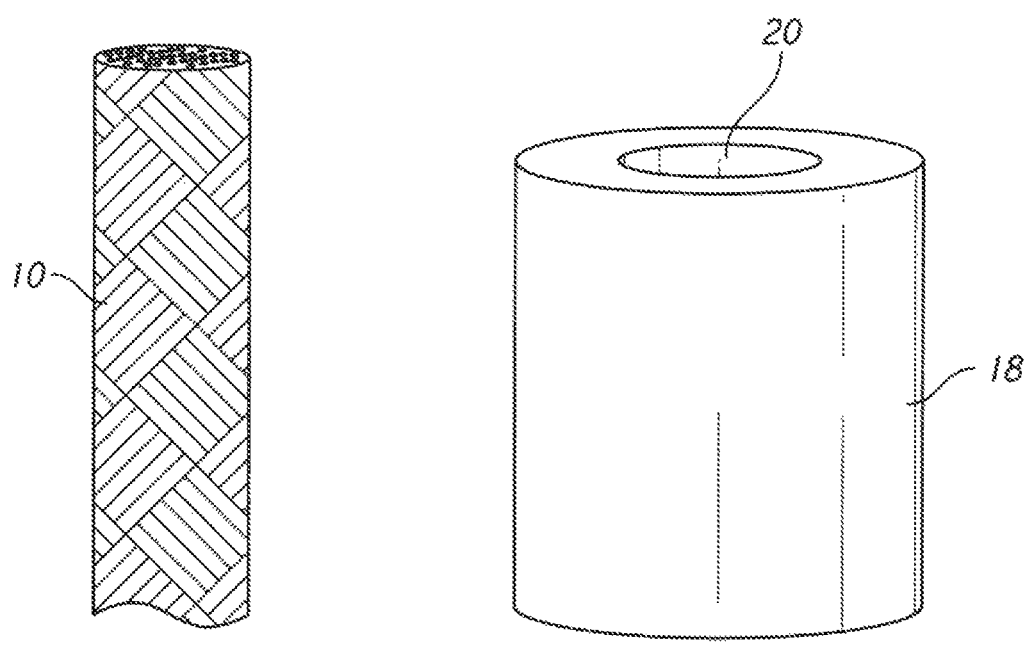
FIG. 1 is a perspective view, showing a prior art linear tensile member (a cable) and a prior art end fitting (an anchor).
Figure 2:
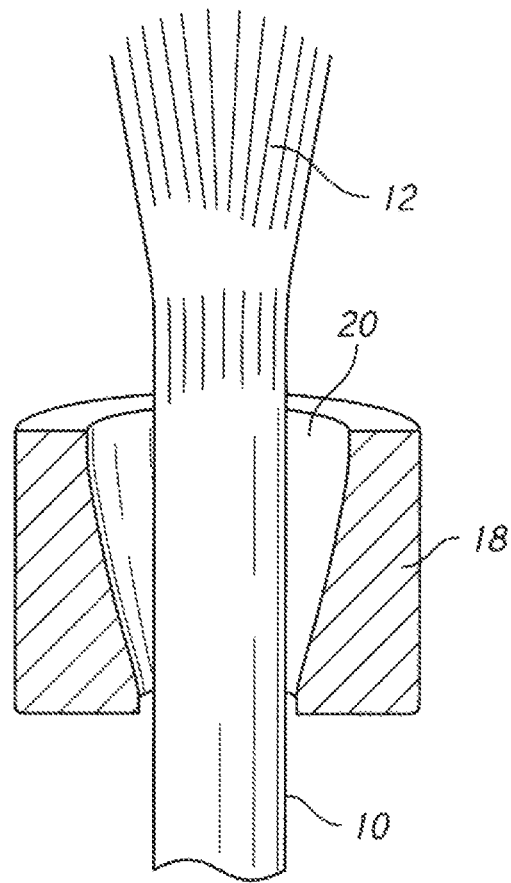
FIG. 2 is a partial sectional view, showing a prior art anchor being installed on a cable.

REFERENCE NUMERALS IN THE DRAWINGS 10 cable
12 splayed filaments
18 anchor
20 cavity
22 cavity wall
24 central axis
26 transition region
28 neck region
30 middle region
32 distal region
34 extended region
36 unpotted fibers
38 filament
40 liquid-rich region
42 liquid-lean region
44 cable clamp
46 anchor clamp
48 cable receiver
50 cable receiver
52 retaining plate
54 proximal end
56 distal end
58 thermocouple
60 thermocouple
62 thermocouple
64 seal plate
66 female thread
68 spike
69 plug
70 male thread
72 distal heater
74 middle heater
76 proximal heater
78 auxiliary anchor
80 auxiliary potted region
82 severed filaments
84 auxiliary cavity
86 coil
88 binder
90 mold half
92 mold cavity half
94 injection sprue
96 feed line
98 jacket
100 strand
102 anchor plate
104 slot
106 pocket
108 slot
110 collector
112 load-transferring element
114 alignment fixture
116 central cavity
118 hybrid tensile member
120 synthetic core
122 wire strand
124 filler
126 multiple cavity anchor
128 strand clamp
130 first cavity
132 second cavity
133 third cavity
134 axis
135 fourth cavity
136 axis
137 fifth cavity
138 passage
139 sixth cavity
140 bar
142 heat transfer passage
144 heat transfer passage
146 inlet
148 outlet
150 hybrid strand
151 capstan
152 drive motor
154 clamp plate
156 actuator

DETAILED DESCRIPTION OF THE INVENTION

The present invention takes advantage of the transition properties of the polling compound. Referring back to FIG.

3, the reader will recall that distal region 32 has a significantly higher ratio of potting compound to filaments than neck region 28. This is true because the cross sectional area of the filaments is the same for both regions, but the cross-sectional area of the expanding cavity is larger in distal region 32. Thus, in distal region 32 the gaps between the filaments are larger and these gaps tend to be filled by the liquid potting compound.

If a potting compound has an exothermic cross-linking transformation (common for epoxies, polyesters, and many other compounds), then more heat will be generated in distal region 32 as compared to neck region 28. This is true because the distal region has a higher concentration of liquid potting compound and a lower concentration of inert filaments tending to absorb the heat produced. The result is that the temperature will rise faster in distal region 32. The heating process tends to build upon itself since both the potting compound and the filaments tend to be good thermal insulators. The temperature in the liquid-rich region will rise as the solidification reaction of the potting compound begins. The heat cannot easily be conducted away and the rising temperature causes the solidification process to accelerate. The acceleration of the reaction in turn generates still more heat. The situation is analogous to a "thermal runaway." One of the reasons that slow-transforming potting compounds are often used in large terminations is to prevent the build-up of too much heat, which can actually damage the synthetic filaments.

The rate of cross-linking of such potting compounds is dependent upon temperature. A higher temperature produces a higher cross-linking rate and thus a higher rate of transition to the solid state. The result is that the potting compound in the distal region transitions to the solid state before the potting compound in the neck region. The present invention takes advantage of this phenomenon and in some embodiments actually seeks to control and modify this phenomenon.

In some preferred embodiments, the potting compound within distal region 32 is allowed to "set" sufficiently to control the motion of the cable filaments while some amount of tension and/or translation is applied to the cable. The application of the tension and/or translation tends to improve two physical characteristics of the filaments within the potted region. These are: (1) filament alignment, and (2) effective load sharing. In most cases, the second phenomenon tends to be more important. However both will commonly impact breaking efficiency and repeatability.

Figure 4:
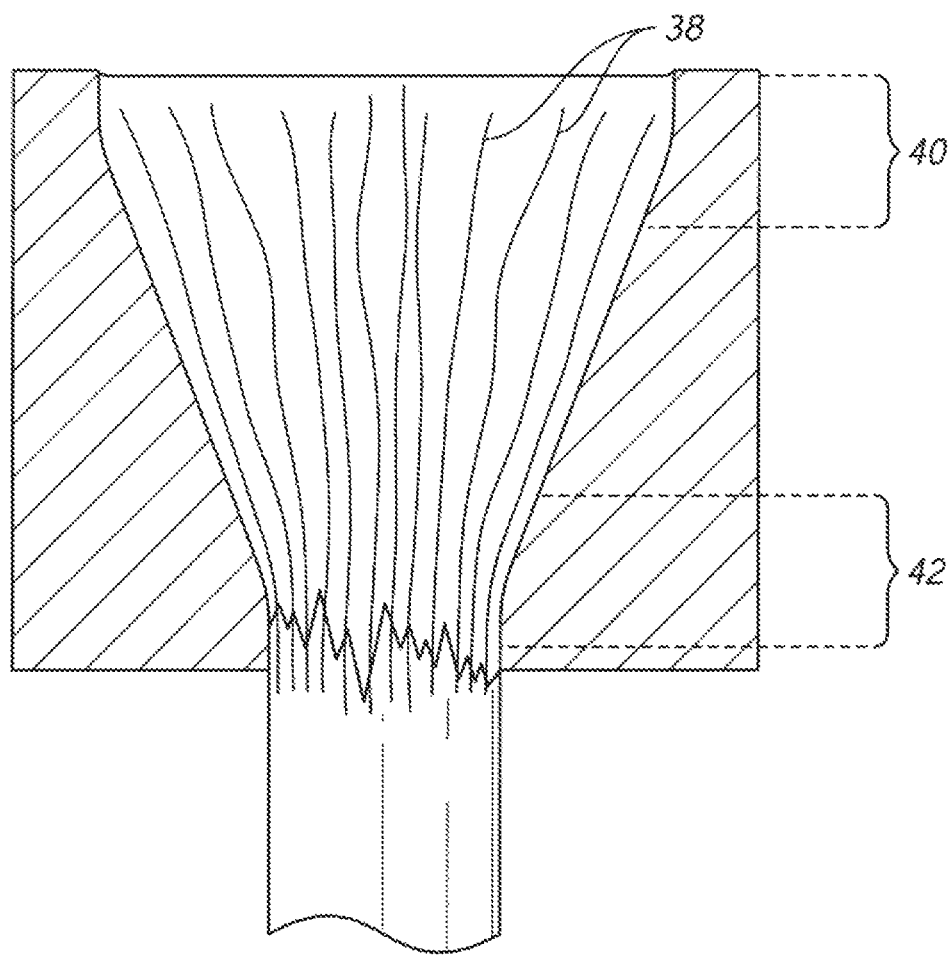
FIG. 4 is a sectional elevation view, showing the strand alignment in the embodiment of FIG. 3.

Looking at FIG. 4, the reader will observe how the filaments 38 within the liquid potting compound are oriented. They run roughly in the same direction as the central axis of the cable. However, many filaments are not completely straight. Instead, they curve and slew laterally with respect to the central axis of the cable (Some divergence is obviously desirable for an expanding anchor cavity but a disorganized "curvy" arrangement is not desirable). The inventive process improves filament alignment so that the unwanted curvature is reduced or eliminated in certain regions.

Of even greater importance is the variation in axial or longitudinal position of the filaments, which impacts the load sharing between filaments when the tensile member is loaded. This phenomenon is easier to explain than to illustrate. The millions of filaments typically found in a synthetic cable slip easily over one another as they have little surface friction. Normal handling of a cable will cause some filaments to extend a bit further at the cable's end than others. In addition, the small filament's lack of compressive and lateral stiffness means they are easily disoriented during any handling or even the effects of gravity.

High-performance synthetic filaments such as used in the present invention do not stretch much before breaking. Thus, when a cable is loaded in tension, the relatively short filaments carry a larger proportion of the load and the load is not shifted to other, longer filaments because the short filaments do not stretch much. Some long filaments may in fact be completely unloaded.

The present invention is useful in improving load sharing among the filaments so that—for example—the shorter filaments do not carry more load than the longer filaments. It is beneficial in many instances to apply tension to the cable during the transition process of the potting compound in order to produce a small amount of displacement parallel to the cable's central axis while the filaments are still able to "slip through" the potting compound to some extent. Returning to FIG. 3, the invention monitors for a defined transition in the state of the potting compound toward the solid state. This defined transition can be a sufficient hardening to actually lock the filaments in place in a particular region. However, more commonly, the defined transition will be a point in the solidification state that is more like thick syrup. In that state, the applied tension allows the filaments to be pulled through the syrupy potting compound.

In order to distinguish this applied tension from a tension that is applied to the cable when the potting compound has fully cured, the tension applied in the present invention will be referred to as "potting compound transition tension," meaning a tension that is applied after the potting compound has started transitioning to a solid but before it is fully cured. The process of applying such tension will be referred to as "potting compound transition tensioning." The potting compound transition tension will typically be much lower that the amount of tension the cable is designed to ultimately carry. In fact, the putting compound transition tension will often be in the range of ⅕ to ¹⁄₁,₀₀₀ of the tension the cable is ultimately designed to carry. The reader should also be aware that the potting compound transition tension can assume many profiles, including:

1. The application of a single tensile value for an extended period;
2. The application of a single tensile value for a first interval followed by a reduction to a lower tensile value for a second period;
3. The application of a tensile value that follows a complex load or displacement curve over time;
4. The application of pulses of tension;
5. The application of close loop control (discussed in more detail subsequently) in which the tension is varied according to a measured feedback value such as reactive force, displacement, or a rate of change for either of these;
6. The application of a stepped tension that increases over time;
7. Short pulses of a relatively high tension; and
8. The application of an open-loop system in which a set tension profile is applied without any feedback.

As will be explained in more detail subsequently, the time at which the potting compound transition tension is applied is often very important. The passage of time in this context can be measured in various ways. One good way is to measure the time interval between the time that the liquid potting compound is introduced to the cavity in the anchor and the time that the potting compound transition tension is initially applied—recognizing that the potting compound transition tension may be applied over an extended period. This particular interval shall be referred to as the "potting compound transition delay."

Previously it was stated that in some preferred embodiments a greater degree of solidification is allowed to occur in the distal region prior to the application of tension. While ideal, this is not significant for all the preferred embodiments. In some of the preferred embodiments solidification will be fairly equal throughout the cavity at the time tension is applied. An example of this is a small-cavity anchor with a potting compound having a slow cure rate. However, even a relatively small degree of viscosity increase can be sufficient to allow the application of tension and the resulting filament alignment and length equalization.

Via the application of tension under controlled conditions the alignment of the filaments is improved. Even more importantly, however, shorter filaments will be translated further than longer filaments and the result will be that each filament is given a more equal share of the tensile load on the cable. A short thought experiment ably demonstrates this concept. Consider a first filament that has a long portion lying within the anchor cavity (the "long filament") so that the portion of the filament lying within the anchor cavity bends through several curves. Consider also a second filament that has a relatively short portion lying within the anchor cavity (the "short filament") so that the portion of the filament within the anchor cavity is already nearly straight before the inventive process is applied.

Once the potting compound in the anchor cavity region reaches a thick-syrup state tension is applied to the cable and a small and controlled amount of linear motion is permitted (The cable is dragged along its central axis in a direction tending to pull the cable out of the anchor). The "short filament" immediately comes under tension and its free end is dragged through the potting compound. The "long filament" on the other hand, straightens while its free end remains in place. Preferably, the amount of permitted translation is that amount which just begins to move the free end of the longest filament. Once this amount of translation is reached, the cable is held in place and the solidification of the potting compound continues to completion.

At the end of the process both the "short filament" and the "long filament" have been straightened. The free end of the "short filament" will be closer to transition region 26 than the free end of the "long filament" (since the free end of the short filament has been dragged along). However—once the potting compound is completely solidified—both filaments will tend to come immediately under load as soon as tension is applied to the cable. Thus, the load distribution between the two filaments has been improved.

The reader should note that in this thought experiment the term "short filament" refers to the length of that particular filament lying within the cavity of the anchor and the term "long filament" refers to the length of the other filament lying within the cavity. In fact, the overall length of both filaments may be identical and the overall length of the "short filament" might even be longer than the "long filament." In the thought experiment, longitudinal slippage or some other phenomenon has produced a state where more of the "long filament" is found within the anchor cavity than the "short filament." This is a common occurrence.

Figure 3:
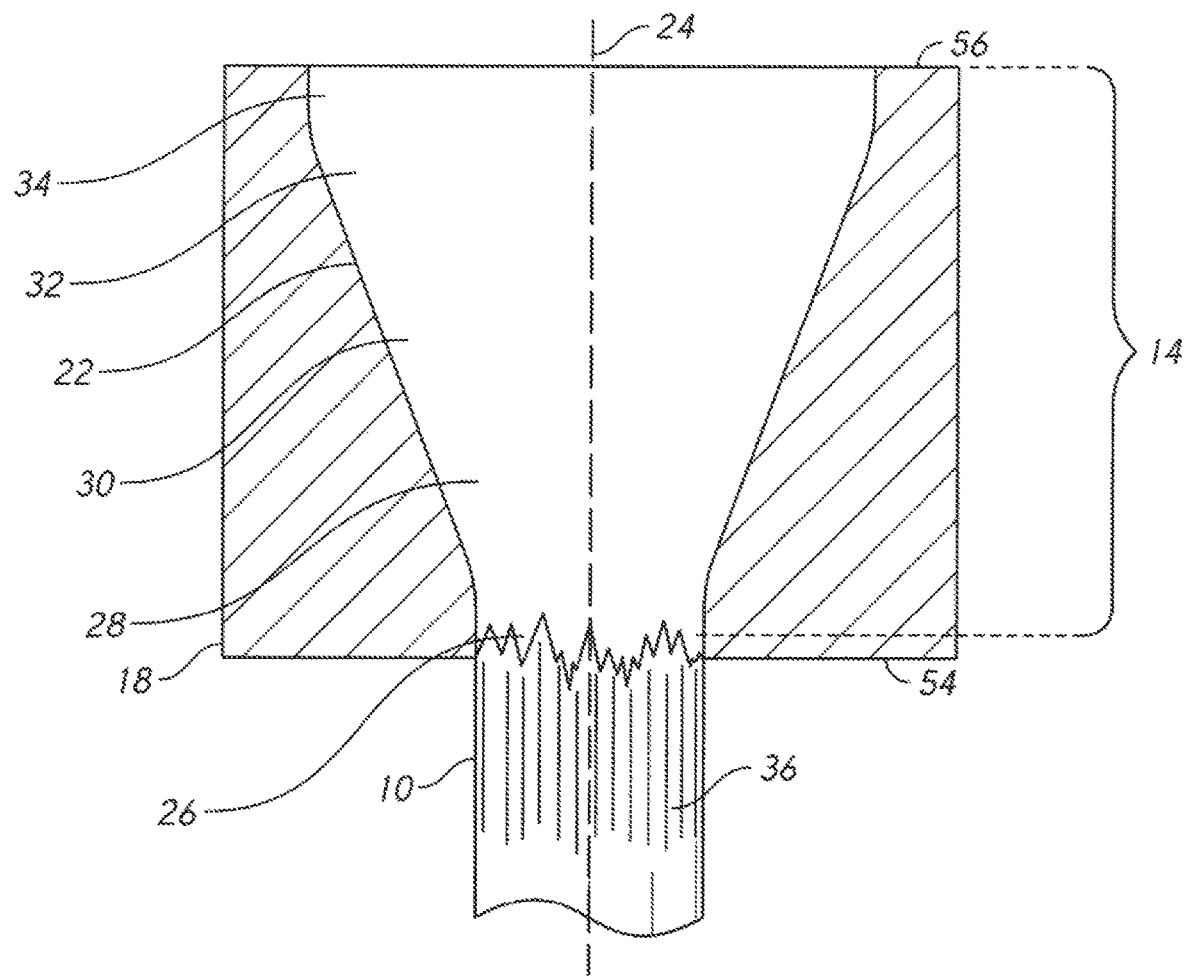
FIG. 3 is a sectional elevation view, showing the components of FIG. 2 after they have been potted into a complete termination.

Still looking at FIG. 3, the applied tension tends to pull the filaments within middle region 30, neck region 29, and transition region 26 straight and provide a more uniform load distribution. These changes produce enhanced overall breaking strength and improve other termination properties as well. Of note, these shifts in position are often ultra-small, such as hundredths or even thousandths of an inch. The depictions in the illustrations are exaggerated so that they can be seen. In reality the movements are quite small. However, they can have a very significant impact on performance. Tension is preferably maintained on the cable while the balance of the potting compound transitions sufficiently toward the solid state to hold the filaments in the alignment achieved.

The result is typically not perfect. The filaments will not be perfectly aligned nor perfectly organized. However, the inventive method does produce a significant advantage over the disorganized initial state of the filaments.

The amount of tension applied will often be small relative to the tension the cable is designed to carry. As an example, consider a cable having an ultimate tensile strength of 12 million Newtons (about 3 million pounds). The applied tension for such a cable in the application of the inventive method would only be about 1.2 million Newtons (about 300,000 pounds) (and in many cases will be much less). Thus, the tensile force required to carry out the present invention is modest in comparison to the break strength of the cable.

It is helpful for the reader to consider some of the properties of potting compounds. In particular, those compounds that transition from a liquid state to a solid state via an exothermic reaction. Many if not most of these compounds undergo a cross-linking transformation in which short molecular chains add additional links to become longer and longer. The longer molecular chains also tends to curl, creating cross links between adjacent chains. The result is a non-crystalline solid.

Those knowledgeable in the field will know that polymer cross-linking is not a single transformation like would be the case with many metals. Rather, the polymer tends to smoothly transition from one state to another. At a first time it may be a low-viscosity liquid that smoothly flows under the influence of gravity. At a second later time it may transition to a syrup-like consistency. At a still later time it may be a spongy solid. At a still later time it may intimately transition to a hard solid (though never with a crystalline structure).

In addition, many cross-linking polymers go through a "B stage" transition explained previously. They start with one viscosity at ambient temperature when the two constituents are mixed. Heat produced by the exothermic reaction causes the viscosity to drop (in some instances substantially). Later, as the cross-linking progresses the viscosity climbs again and ultimately the cross-linking produces a solid.

The present invention does not need to wait for the potting compound in the distal region to transition to a hard solid. Even a "syrupy" consistency is enough to allow a small amount of tension and resulting translation to be applied to the cable. The process will vary depending upon many factors such as:

1. The potting compound used;
2. The mix ratio of the potting compound;
3. The size and shape of the cavity:
4. The anchor geometry, anchor materials, and anchor coatings used;
5. The size, type, and distribution of the filaments;
6. Any internal hardware or components that rest in the cavity;
7. The heating and/or cooling applied; and
8. The initial conditions (things such as the anchor temperature, the potting compound temperature, ambient temperature, etc.).

Figure 5:
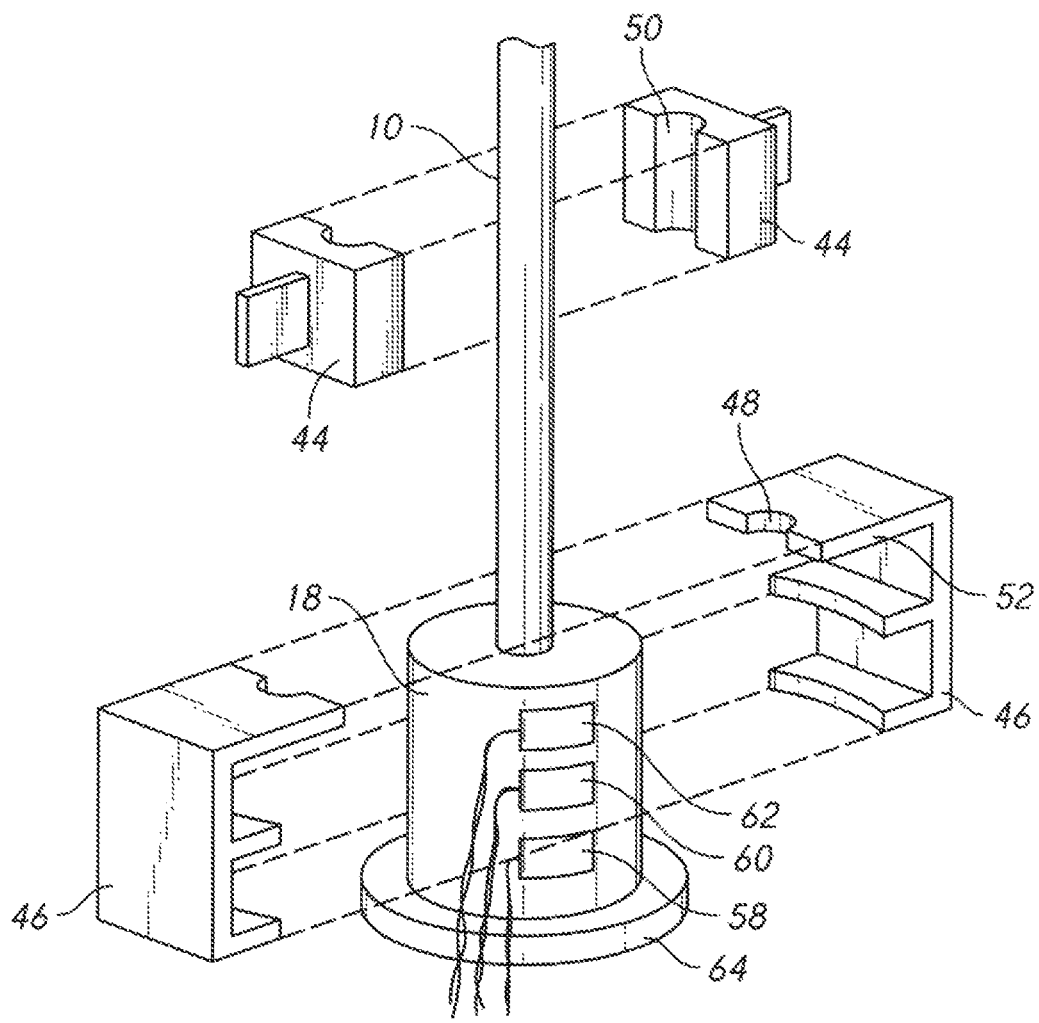
FIG. 5 is an exploded perspective view, showing components that may be used to apply tension to the cable while the potting compound transitions from a liquid to a solid.

Some specific examples will serve to aid the reader's understanding. FIG. 5 shows one exemplary apparatus configured to carry out the present invention. A length of filaments from cable 10 is placed in a cavity within anchor 18 as explained previously. The assembly of cable and anchor in this example has been inverted, so that the distal end of the anchor faces downward. Seal plate 64 is placed over the distal end to prevent the liquid potting compound running out the bottom of the assembly. The inversion of the assembly has advantages in many instances but the invention can be carried out in other orientations so the orientation shown in the view is not limiting.

A pair of anchor clamps 46 is provided. These include engaging surfaces configured to bear against and hold the anchor in place. In addition, they include retaining plate 52 positioned to slide over the top of the anchor (in the orientation of the view). A cable receiver 48 is provided in each retaining plate 52 so that the cable itself is free to slide with respect to the anchor clamps.

A pair of cable clamps 44 is provided. Each of these includes a cable receiver 50 that is sized to fit around the cable. The cable clamps are configured to frictionally engage and hold the cable so that they may apply tension to the cable. In order to do this engaging features may be included in the cable receiver. Exemplary engaging features include rubber inserts, ribs, knobs, and knurls. Other ways to apply tension to the cable include applying a temporary anchor to the free end and wrapping a length of the cable around a moveable or driven capstan.

Both the anchor clamps 46 and cable clamps 44 should be viewed as largely conceptual depictions. The actual form of these devices will vary widely. A cable clamp is anything that is capable of engaging a cable or strand and applying tension to it (When applied to a single strand in this disclosure the clamp will be referred to as a "strand clamp"). Likewise, an anchor clamp is anything that is able to secure the anchor so that the anchor can be held in position or moved as desired.

Friction-based clamps such as shown are limited in how much they can pull. Many cables have an extruded jacket. At some point the friction-based clamps will just start pulling the jacket along the cable. Even without a jacket, friction-based clamps may cause the outer filaments to slip relative to the inner filaments. Neither result is desirable.

One type of "cable damp" that avoids this problem is an approach using interweaving or splicing. Many multi-stranded cables are constructed of interwoven individual strands. Such cables are often joined together using well-known splicing techniques. Examples of these techniques are described and illustrated in commonly-owned U.S. Pat. No. 9,791,337, which is hereby incorporated by reference. As is explained in detail in U.S. Pat. No. 9,791,337, it is known in the prior art to provide a cable made of twelve strands that are braided together. It is possible to loosen the braid over one portion of such a cable and interweave the strands of another cable to create a cable-to-cable splice. Such splices can be very strong and their performance is well known in the art. They are also reversible using known techniques.

Thus, one type of "cable clamp" that can be used in the present invention is a length of multi-stranded cable that already has a termination affixed to one end (a "secondary cable"). This secondary cable can be spliced to the cable presently being terminated—either at the end of the cable presently being terminated or at some intermediate point. Tension can then be applied to the cable presently being terminated via the secondary cable and the splice. Another type of "cable clamp" could simply be wrapping the non-terminated end of a cable around a capstan and using the capstan to apply tension.

Another unusual example of a cable clamp is a "Kellems Grip." This known device slips an attachment feature connected to a woven mesh over the exterior of a cable. Tension is applied to the attachment feature and the woven mesh contracts and grips the cable over an extended length. Tension may thereby be applied to the cable. Many other devices can be provided to apply tension to the cable. All of these devices can be consider a "cable clamp."

It is important for the present invention to determine when a "defined transition" has taken place in the potting compound (The potting compound in all of the cavity or in some region of the cavity—such as the distal region—has reached a suitable viscosity or cure state). If the transition of the potting compound to a solid is an exothermic reaction, then the measurement of temperature is a good proxy for actually measuring the viscosity in the distal region. Thus, the embodiment of FIG. 5 includes temperature sensing devices. One or more thermocouples (58, 60, and 62) are installed to monitor the temperature of anchor 18 at various points. These thermocouples are connected to monitoring circuitry which converts their output to a temperature parameter. A single thermocouple will often be sufficient—particularly when the anchor is made of a thermally-conductive metal.

Figure 6:
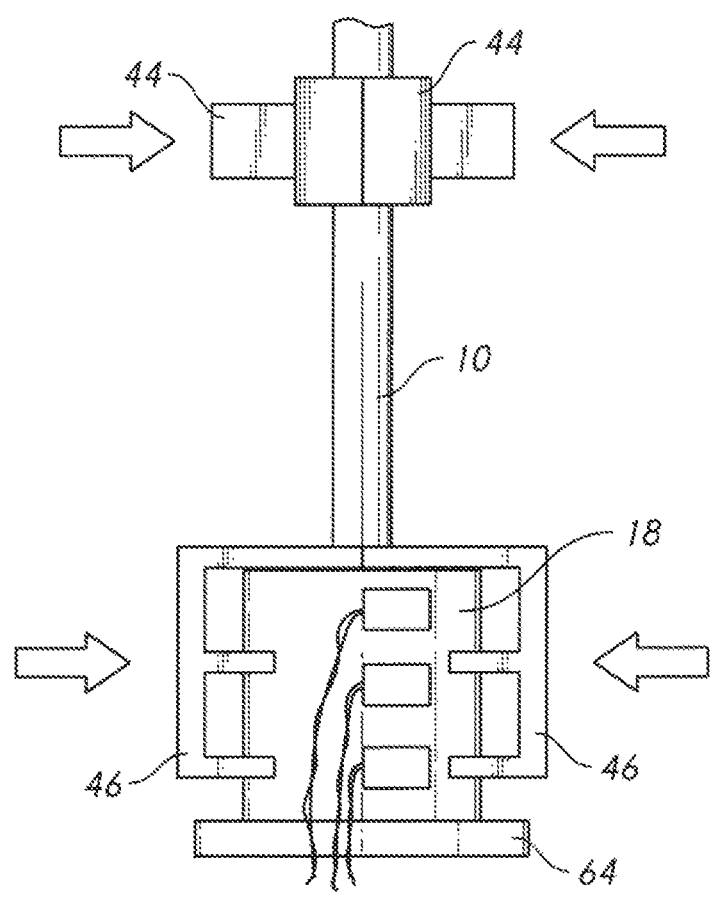
FIG. 6 is an elevation view, showing the components of FIG. 5 clamped to the cable.

FIG. 6 is an elevation view of the assembly of FIG. 5 after the anchor clamps and cable clamps have been clamped inward as indicated by the arrows. In this configuration the anchor is held securely by the two anchor clamps 46 while the cable is held securely by the two cable clamps 44.

Once the components are clamped in place, monitoring begins for the defined transition of the potting compound in the distal region of the expanding cavity. This "defined, transition" is the point at which the potting compound in a certain region is at the desired point in its transition toward being a solid such that tension and/or translation may be applied to the cable in order to produce the necessary straightening and improved load distribution results.

Figure 7:
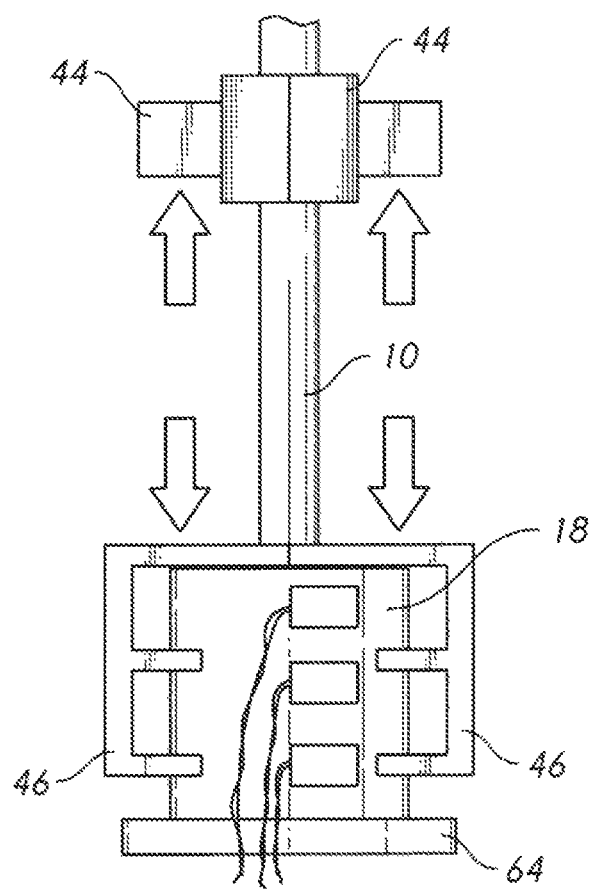
FIG. 7 is an elevation view, showing the components of FIG. 6 applying tension to the cable.

FIG. 7 shows the step of applying tension. Tension may be applied by (1) fixing the anchor position and polling the cable clamps 44 upward, (2) fixing the cable clamps and pulling the anchor downward, or (3) a combination of the two. When a pulling force is applied, tension in the cable will typically spike and then slack off as the filaments begin to pull through the potting compound. Preferably, further translation of the cable is stopped at this point. Some tension may or may not be continued after translation has stopped.

One of the simplest ways to monitor for the defined transition in the potting compound is to monitor the temperature of the anchor using one or more thermocouples. If the same initial conditions are used (same potting compound at the same initial temperature in the same anchor/cable assembly at the same relative positions), then one may experiment to determine what measured anchor temperature corresponds to the achievement of the defined transition in the potting compound in a desired region such as the distal region.

There are many possible experiments that could be run to evaluate the relationship between the cure state of the potting compound in a certain region and the process parameters for the translation process itself. An example of one of the many possible experiments may be described as follows:

1. Lock the assembly together as in FIG. 6;
2. Monitor the anchor temperature;

3. At a given anchor temperature, apply tension to the cable;

4. If the cable translates too far and/or translates at a very low tension then the experiment is a failure because the defined transition had not yet occurred and one then knows to wait until a higher viscosity cure state is achieved before applying tension;

5. If the cable undergoes a spike in tension when the force is applied and the filaments appear to be dragging slowly through the potting compound, then limit the translation and allow the potting compound to fully cure (in some cases over a day or more);

6. Measure and record the break strength of the termination; and

7. Possibly examine other cable properties such as filament alignment (by sectioning the cable).

One may then compare the ultimate break strength of the termination against the measured temperature at the time tension was applied. One measured temperature (or range thereof) will produce the best result. This measured temperature then corresponds to the defined transition in the desired region of the cavity and it should be used as the trigger point for applying tension to the cable. Once this measure temperature is found, if will remain the same (or very nearly so) for the same combination of all the factors (potting compound, filaments, anchor type, etc.). However, as one would expect, a new experiment will be needed for each different combination. This not only includes the determining the defined transition point, but also the translation process parameters.

In some instance, some or all of the filaments will be pulled completely free of the distal region so that the free ends of these filaments lie closer to the proximal end of the anchor. In other instances, some or all of the filament ends will remain fixed in the distal region and movement is limited to the region of filaments at the proximal end. Depending on the relative lengths of the filaments with the anchor cavity, in some instances some filaments may not be moved at all.

There is a tendency for the applied translation to pull some of the liquid potting compound out the proximal end of the anchor and introduce a void in the distal and/or extended regions of the cavity. For these instances it may be desirable to introduce additional potting compound (or some other filter material) to fill the void.

The operator preferably understands the relationship between the force applied to the cable, the reactive tension with the cable, and the resulting translation. These may be monitored and automated using a computer system to apply the loads, control velocity, measure the reaction forces, and measure the translation distance. Many different approaches to tension and translation are of course possible, including:

1. Ramping up the tension and allowing continued translation;
2. Ramping up the tension at a certain rate until a certain load value (reactive force) or measured distance (displacement) is achieved;
3. A variable tension or velocity curve and limitation on translation;
4. Varying tension to create a desired translation velocity and amount of total translation; and
5. Ramping up the tension on any of the above configurations in stages, and any combination or addition of steps thereof.

In some cases it may be desirable to monitor the temperature of a specific region within the anchor more precisely in order to determine the defined transition. Multiple temperature sensors may be used at different points of the anchor—as actually shown in FIG. 6. One may also use a bore-hole through the side of the anchor so that a temperature sensor can be placed directly adjacent to the curing potting compound. In most cases, however, the temperature rise is fairly gradual and the anchor material is thermally conductive (such as aluminum). In most cases a single temperature for the anchor as a whole will work and the location of the temperature sensor is not overly critical.

The reader should note that the measurement of temperature within the distal region is only exemplary. In some embodiments it may be more important to measure the temperature in the middle region, the neck region, or the transition region. Temperature is really just a proxy for the defined transition (the achievement of a desired potting compound characteristic in a defined region of the anchor), so some experimentation may be needed to determine the best location for the temperature measurement.

Figure 8:
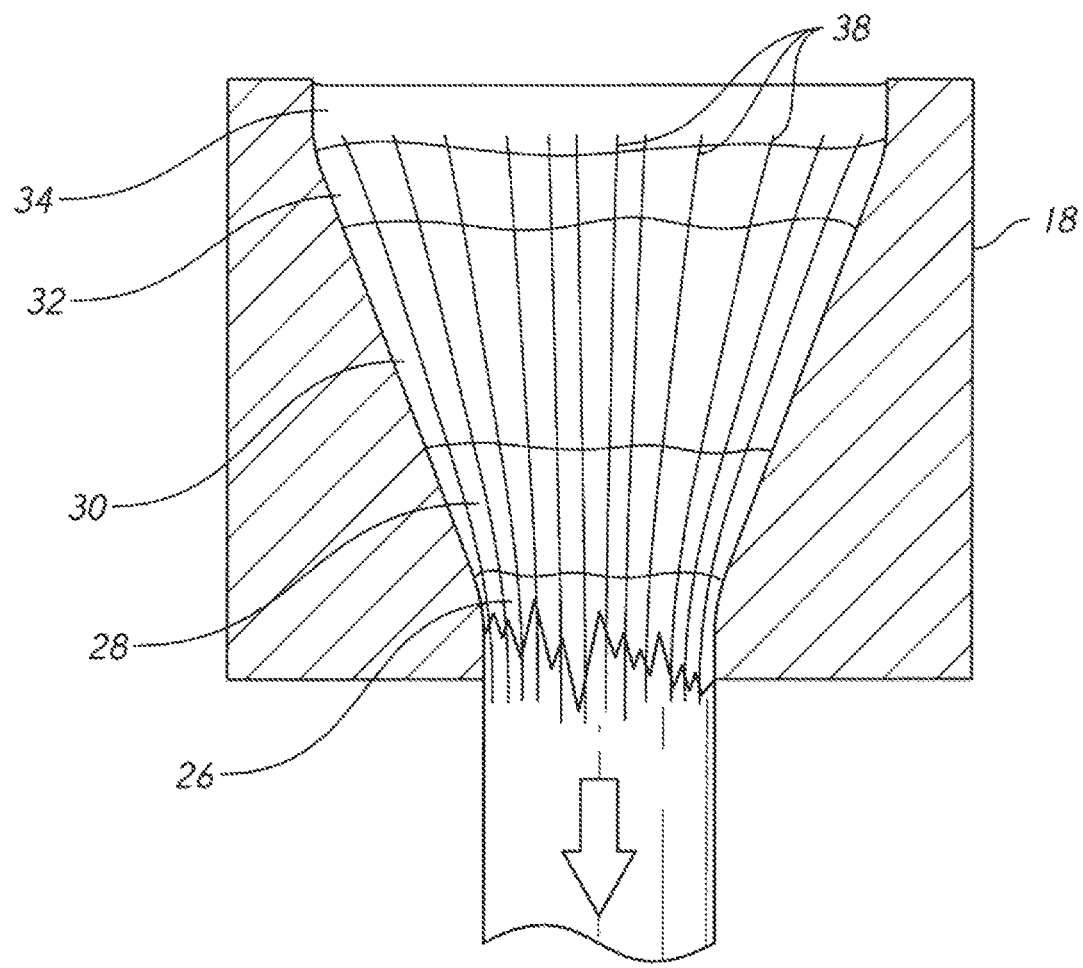
FIG. 8 is a sectional elevation view, showing the filament alignment resulting from the inventive process.

FIG. 8 shows the result of applying the inventive process. The filaments have been pulled some distance through the potting compound while it was solidifying. The filaments are better aligned and they have been given better load distribution. This improvement in load distribution and filament orientation produces the improved termination performance.

The reader will also note that the anchor in FIG. 8 is in an upright position with its distal portion facing upward. The entire potting process may be carried out in this orientation and in fact this gives good access to the distal region. For example, heat lamps or UV lamps may be used in conjunction with hardness or other measurement tools, which may be easily applied to the exposed portion of extended region 34. The fact that a portion of the extended region 34 is exposed allows for other opportunities as well, including the following:

1. If a UV-cured potting compound is used, UV light can be applied to the exposed portion of the extended region to hasten the transition of that exposed portion to a solid. This solidified region will then tend to hold the ends of the filaments in place so that tension can be applied. This applied tension can then be used to improve the alignment of the filaments further down into the strand cavity;
2. If a thermoset potting compound is used then radiant heat can be applied to the exposed portion of the extended region in order to hasten the transition to a solid in that region;
3. If a two-part potting compound is used then additional hardener can be added to the exposed portion of the extended region to hasten the transition of that region.

The experimental methods described for the embodiments that correlate a measured temperature with the best termination performance may be applied to other measured values as well. As a first additional example, there are devices which measure the dielectric properties of the potting compound as it transitions to a solid state. These measurements may be used to determine the defined initial transition.

As a second additional example, time itself may be correlated to the termination performance. If one carefully controls the conditions (temperature, potting compound mixture ratio etc.) so that they are repeated precisely each time, then the defined transition can occur at the same time in each instance. One may experiment by applying the tension force at various times and correlating the termination performance against the time at which tension was applied. This method can be applied across a broad range of cure times. As an example, the defined transition may occur in as little as 5 minutes or as long as 24 hours. As long as the process is repeatable and demonstrates the desired performance, the length of time involved is not particularly important.

The "desired performance" may not necessarily be the maximum possible breaking strength for the termination. A few years ago the breaking strength of a termination for a synthetic or hybrid cable was considerably less than the breaking strength of the cable itself. In fact, a termination breaking strength approaching 90% of the breaking strength of the cable was considered quite good. Using the present inventive method, it is possible for the breaking strength of the termination to substantially exceed the breaking strength of the cable. It is possible to achieve a termination breaking strength that is 150% of the breaking strength of the cable. However, there may be no point in producing such a result. For a particular application, the desired performance may be a termination breaking strength that is 110% of the breaking strength of the cable. In that case, it is not necessary to fully optimize the termination.

In order for the process to be repeatable, it is important to control certain initial conditions. These include:
1. The potting compound initial temperature;
2. The potting compound formulation (including the mix ratio for 2-part compounds);
3. The anchor initial temperature;
4. The cable initial temperature; and
5. The ambient initial temperature.

A preferred approach is simply to store all the components (cable, anchor, potting compound) in a controlled environment for a length of time so that they all reach the same temperature. The inventive process is then carried out in that same controlled environment so that the initial ambient temperature is maintained as a constant ambient temperature throughout (though the temperature of the potting compound, anchor, etc. may increase due to an exothermic reaction).

In order to create a repeatable process it is preferable to use a fixed ambient temperature (such as 70 degrees Fahrenheit) and one that can be maintained without significant expense. This approach creates a repeatable process without having to pay particular attention to individual variables (recognizing that the temperature selected will depend in some embodiments on the potting compound used, anchor geometry, and other factors).

An experimental ultimate strength curve is preferably created for each new configuration of anchor/cable/potting compound. Such a curve would plot the time from the introduction of the potting compound until the application of the tension specified in the inventive method against the ultimate break strength of the cable and termination after the potting compound is fully cured. This creates an optimum solution for each configuration. Common sense can be applied to minimize the experimental activity. As an example, if an optimum time is known for a particular anchor and a modification is made to that anchor (such as the addition of a revised loading flange) then a small range of time variation around the previously known optimum time can be used to establish a new optimum time value (as opposed to running a full experiment using a broad time range).

The use of time in determining when the defined transition in the potting compound has occurred involves some initial experimentation. However, once the optimum value for time is established, it becomes very easy to run the process with simple monitoring (since only a timing device is needed). The reader may also wish to know that for some configurations time is really the only practical way to determine the occurrence of the defined transition. While many potting compounds involve exothermic reactions, the reaction rate may be so slow that a temperature change is difficult to measure. It is likewise often impractical to measure viscosity without significantly disturbing the potting compound during the cure cycle (and thereby compromising its performance). Thus, in many applications, time will be the best value to measure.

This disclosure has discussed the experimentation in terms of establishing a time versus ultimate strength curve. Those skilled in the art will know that it is not necessary to plot an actual curve. Data points can be collected and a suitable mathematical expression (such as an n order polynomial) can be applied. The optimum point can then be predicted using this curve, and experimentally verified if desired. There are many approaches available to gather the empirical data and the invention is not limited to any particular approach.

As an example, the optimization can be done on the basis of measured reaction forces during the application of tension during the transition of the potting compound. The optimization can also be done on the basis of measured displacement during the application of tension. One may also measure a combination of reaction forces and displacement.

As another additional example one may use an ultra-slow translation process or alternatively stepped micro-translations to determine the time of the defined transition. Once an initial cross-linking has occurred, a controlled tension can be applied and a measuring fixture used to determine the amount of translation resulting from the controlled tension. Increasing viscosity or cure state in a defined region of the cavity can be detected by the reduction in the amount of translation resulting from the application of tension over a limited time. This conclusion would then fix the defined transition.

As a fourth additional example of determining the defined initial transition one may use applied mechanical or electromagnetic waves to the termination assembly and measure the response. This response will change once the potting compound begins its transition to a solid state.

As a fifth additional example, a simple hardness test may be applied to an accessible region of the potting compound. The distal portion of the cavity is often accessible and a force versus penetration probe or other even simpler means may be used to determine hardness. This type of test may be especially useful in configurations such as an open socket (as shown in FIG. 8) where the distal region is exposed.

As a sixth additional example, a viscosity test may be applied to an accessible region of the potting compound. A viscosity measuring device (such as a rotating paddle) can be introduced into the potting compound and used to determine when a desired viscosity has been reached.

As a seventh additional example, micro-translations could be applied at staged intervals. For instance, a 0.5 mm translation could be applied once every 10 minutes. A process controller can be used to apply these and also measure reaction forces. These micro-translations "educate" the process controller as to the present state of cure.

As an eighth additional example, one could apply variable tension needed to achieve a desired translation velocity. This application would then cease after a desired translation had been achieved.

Figure 9:
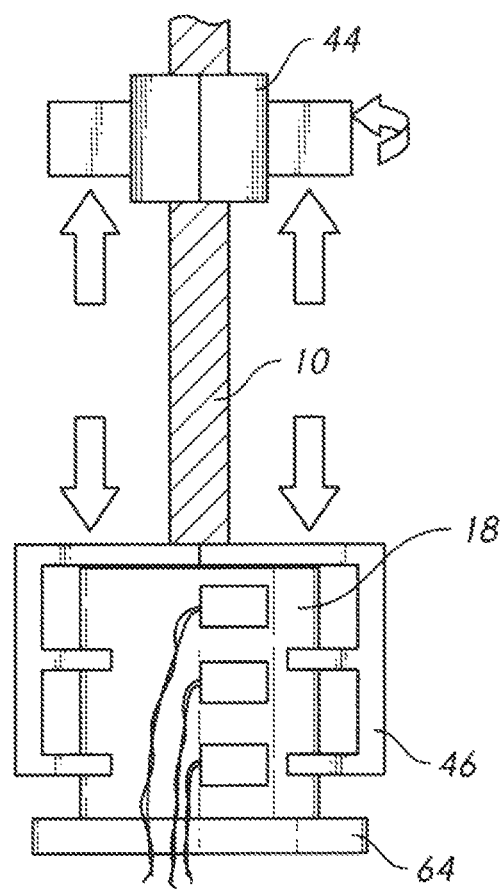
FIG. 9 is an elevation view, showing the addition of a rotational motion during the tension applying process.
Figure 10:
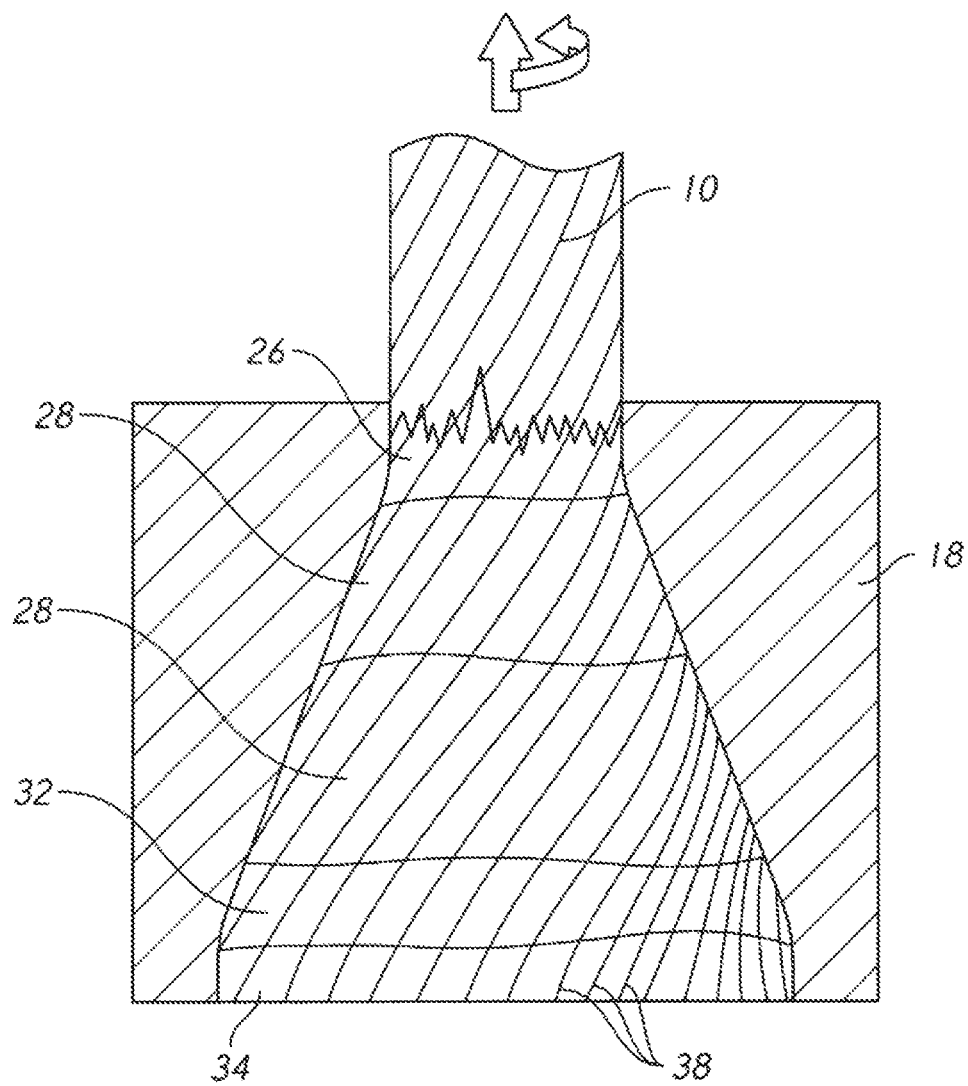
FIG. 10 is a sectional elevation view, showing the filament alignment resulting from the introduction of rotational motion.

Additional steps may be added to the inventive process. FIGS. 9 and 10 show a variation configured for use on a cable having a helical winding. Such a cable has a central axis, but the helically wound filaments are at no point parallel to that axis. They are instead offset by a distance and a helix angle. Such cables are often potted with the filaments lying in an orientation within the anchor cavity that is generally parallel to the cable axis. This fact introduces a bend as the filaments exit the anchor and a resulting stress riser at the point of the bend. In order to reduce this bending transition, the cable may be rotated during the potting process. Preferably this rotation is applied in combination with the application of tension.

FIG. 9 shows the same configuration as FIG. 7. However, in this embodiment, cable clamps 44 are rotated about the cable's central axis while tension is applied. Like the application of tension/translation, the rotation preferably does not commence until after the defined transition of the potting compound within the defined region has commenced. Optionally the rotation could be added before or after the defined transition. Whenever it is applied, the rotation introduces a twist in the filaments within the anchor cavity.

FIG. 10 shows one possible result. The portion of the filaments lying within distal region 32 and extended region 34 have a lesser degree of twist since—in this example—the potting compound was more viscous in these regions when the twist was applied. However, the portion of the filaments lying in the balance of the cavity has been twisted more significantly. Preferably, the amount of rotation is set so that the twist at the transition region 26 approximately matches the helix angle of the filaments in the cable itself. Also important is the fact that the load sharing between the filaments has been more equalized (as explained previously).

Figure 11:
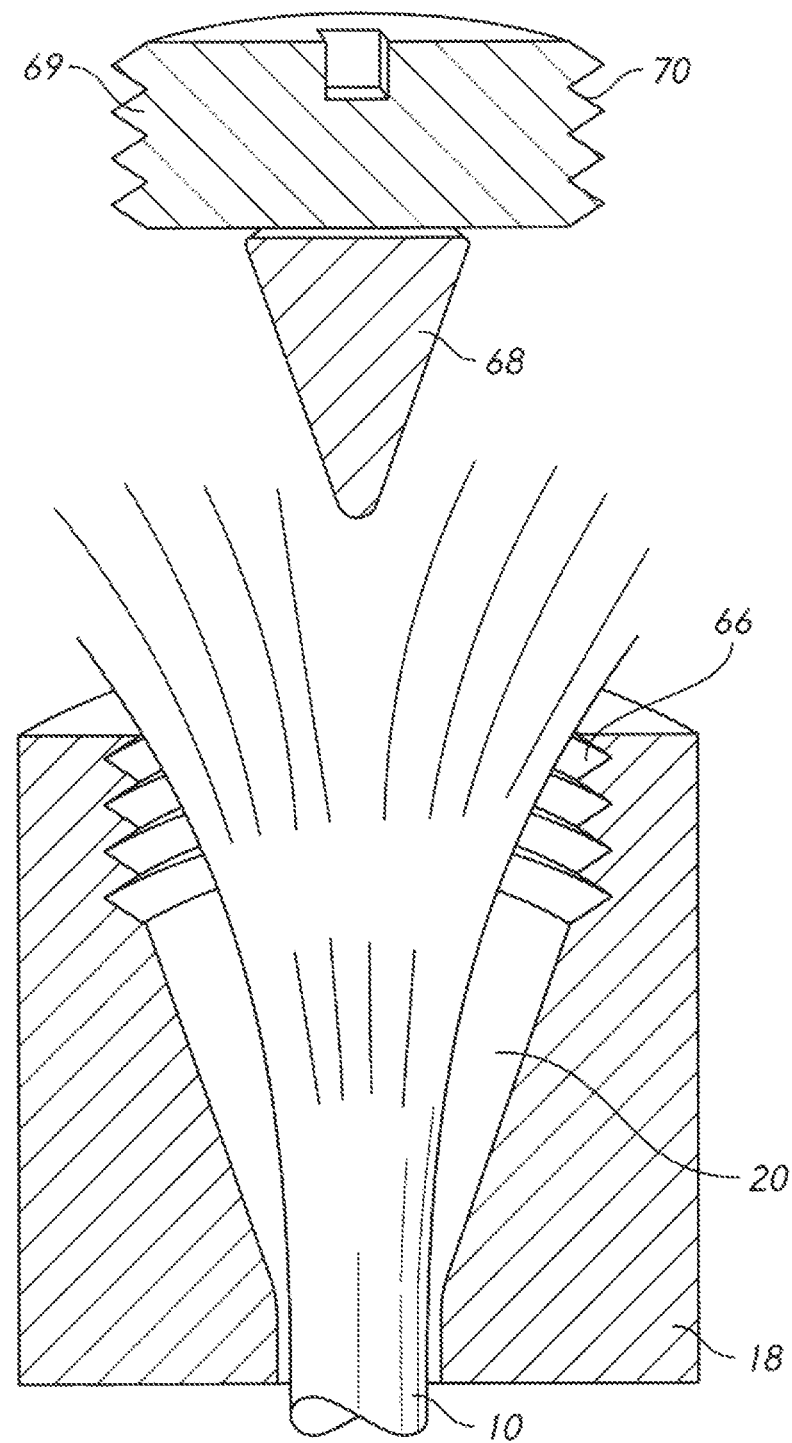
FIG. 11 is a sectional perspective view, showing the use of a spike.
Figure 12:
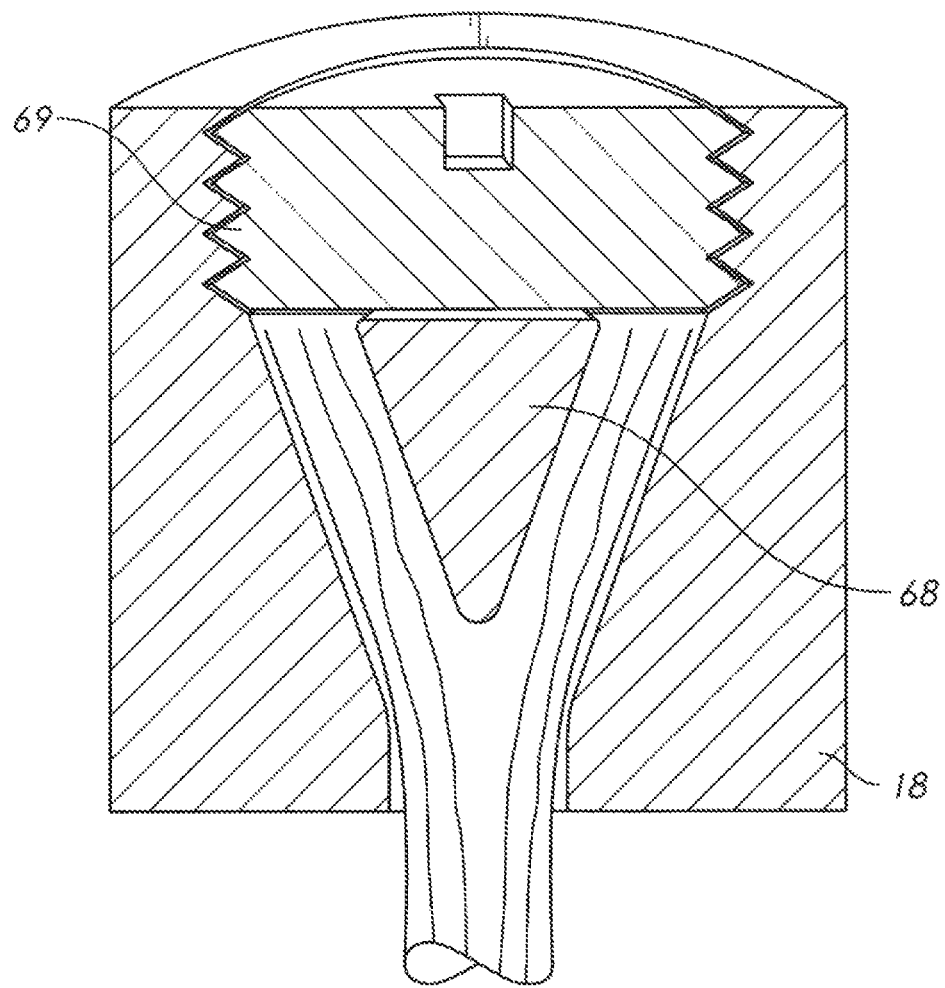
FIG. 12 is a sectional perspective view, showing the assembly of FIG. 11 in a completed state.

Additional components can be added to the anchor assembly in a virtually endless series of combinations. FIGS. 11 and 12 show one example. In FIG. 11 spike 68 is configured to thread into cavity 20 within anchor 18. Male thread 70 on plug 69 is sized to thread into female thread 66 on the upper portion of the anchor. The plug is used to tighten the spike so that the filaments within the cavity are mechanically held.

FIG. 12 shows the result once spike 68 is in place. The same process has been applied. A defined transition was detected and tension/translation was then applied to the cable to align the filaments in the regions while they were still able to move within the potting compound. In this embodiment the cavity defined by the inward-facing anchor wall and the outward-facing wall of the spike has been filled with potting compound. In many instances where a spike is used in a tapered cavity (sometimes called a "spike-and-cone") potting compound will not be used and the filaments will instead be held in place by the mechanical interlock of the spike-and-cone itself.

Figure 13:
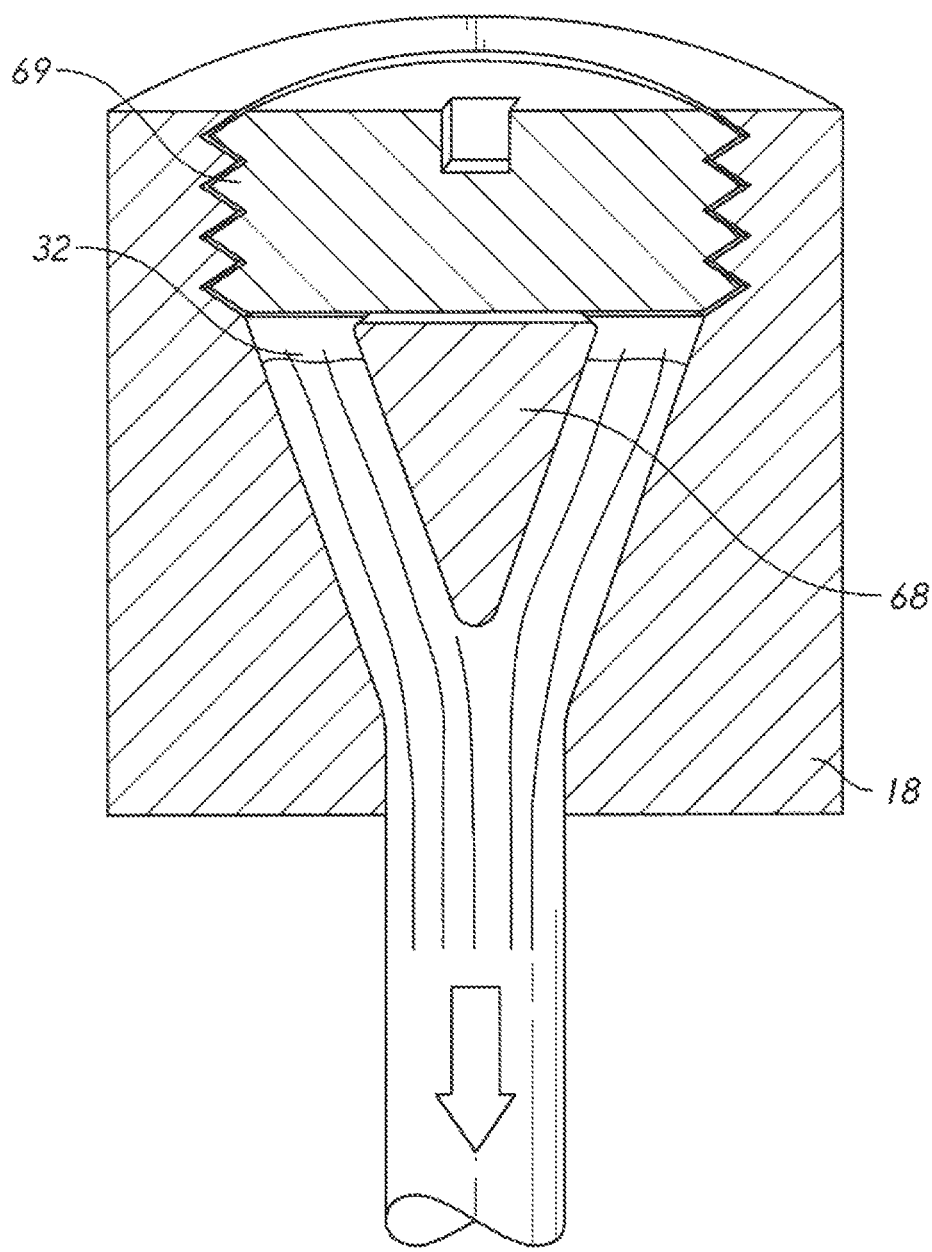
FIG. 13 is a sectional perspective view, showing a spike and cone embodiment in which only a small region of porting compound is used and the filaments are ultimately secured in the anchor using a mechanical interlock.

FIG. 13 shows one example of how the present invention can be applied to a spike-and-cone termination that relies primarily on a mechanical interlock to secure the filaments. A small amount of liquid potting compound is provided to form distal region 32. Once the potting compound in this region has undergone the defined transition, tension is applied to cable 10 in order to straighten and align the filaments.

The reader will note that spike 68 at this point is not fully threaded into anchor 18. Thus, the application of tension to the cable is able to straighten the filaments because they have not yet been fully mechanically clamped in place. In the embodiment shown, tension/translation is maintained on the cable while spike 68 is tightened into its final position. Thus, the filaments are held in the desired orientation while they are mechanically clamped in place by the cone. It should be noted that the polling compound and inventive method could be carried out in the neck, middle, distal regions, and in some cases the entire cavity. The ideal placement of potting compound will vary by anchor or termination design—which could take on any shape or form.

Figure 14:
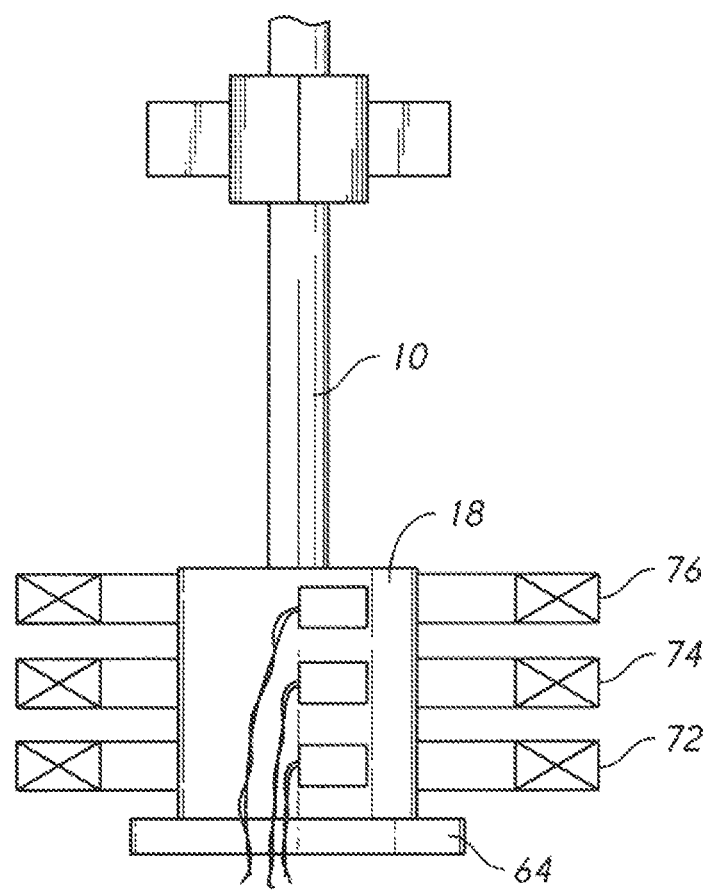
FIG. 14 is an elevation view, showing the addition of multiple heating units to the inventive process.

FIG. 14 shows still another embodiment in which external heating is applied to the anchor during the curing process. One or more heaters (72, 74, and 76) may be placed in any suitable location relative to anchor 18. These apply heat to the anchor in order to raise the temperature of the potting compound in certain regions and thereby control or modify the setting process. As can be imagined, those beating devices can be applied to any desired portion and could even be included in the anchor hardware itself. The defined transition could still be determined by monitoring for temperature in this embodiment. On the other hand, experimentation could be performed to fix the defined transition as a function of the heat applied. In that case, temperature monitoring might not be necessary and one could simply fix the defined initial transition on the basis of the heat applied.

One could also inject catalyzing agents to selectively increase the viscosity or cure state in one region versus another. As an example, a needle can be placed within a portion of the cavity and used to inject additional catalyst into a two-part epoxy so that the viscosity in that region would rise more rapidly.

One could also add other materials to affect heat generation and transfer. If, for instance, one part of the anchor is surrounded by a material having reduced thermal conductivity while another is not, an enhanced temperature difference may be created.

The invention capitalizes on the fact that the potting compound in the cavity tends to transition to a solid more quickly in the distal region than in the neck region. In many embodiments the appropriate difference in cure rate will occur naturally and the proper application of the invention depends mostly on determining when the defined transition in the defined region occurs. However, in other cases it may be necessary to force a desired temperature or cure-rate difference. This can be created by the application of heating, cooling or both. As an example, a heating jacket could be placed around the distal region of the anchor itself while a cooling jacking is placed around the neck region. Passages tor a circulating heating or cooling liquid could also be provided in the anchor itself. It is also possible to provide a potting compound with different mix ratios so that one portion cures faster than the other even under identical conditions.

Those skilled in the art will know that differing cure rates can be produced in some potting compounds by the introduction of UV light, ultrasonic vibration, and certain gases. The invention is by no means limited to temperature-induced differences.

Figure 15:
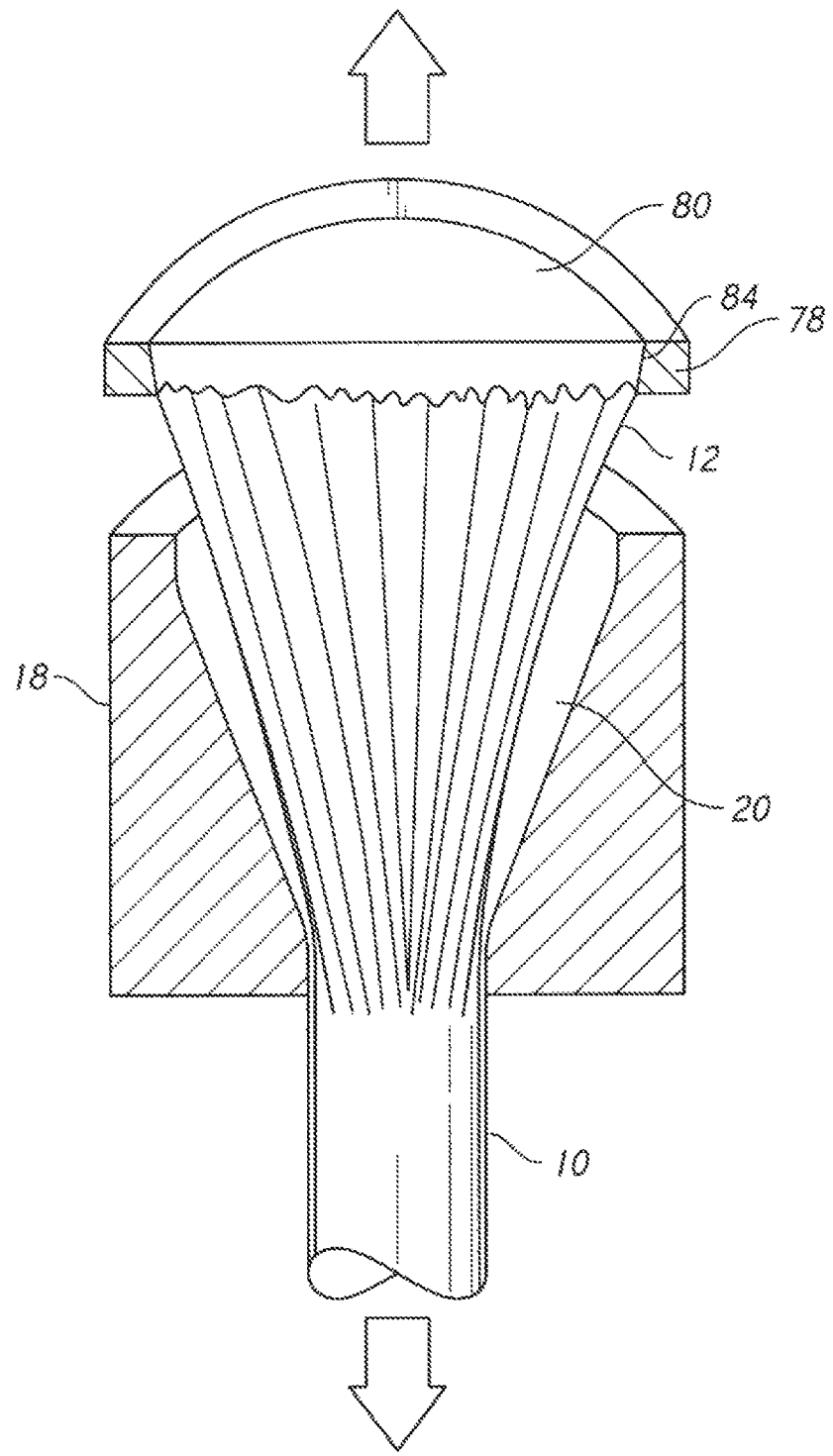
FIG. 15 is a sectional perspective view, showing the use of an auxiliary potted region to align the filaments within an anchor cavity.

In still other embodiments the distal potted region that is used to secure the filaments so that tension can be applied may be located outside of the anchor. As with the spike and cone example in FIG. 12, the inventive process can be carried out solely as a means for improving fiber alignment, and the potting compound may not actually be the load-transfer device itself. FIGS. 15 and 16 illustrate this concept. FIG. 15 is a section view showing the use of auxiliary anchor 78. The filaments are passed through cavity 20 in anchor 18 and potted into auxiliary cavity 84 in auxiliary anchor 78 to form auxiliary potted region 80. The potting compound within auxiliary potted region 80 is allowed to harden sufficiently to hold the filaments in place. Tension is then applied to cable 10 as shown—while anchor 18 is held in the desired relationship. The filaments within cavity 20 are thereby straightened and aligned. Liquid potting compound within cavity 20 (which has been introduced at any suitable time) is allowed to transition to the solid state, preferably while tension is maintained on the cable.

Once the potting compound within cavity 20 has transitioned sufficiently to a solid state, auxiliary anchor may be optionally removed by severing the exposed filaments. The result is shown in FIG. 16. Of course if the ends of the filaments have been pulled completely through this region then fiber severing will not be necessary. Auxiliary anchor may at this point be discarded and the completed termination on the cable put to use. Those skilled in the art would realize the auxiliary anchor or cavity method could be carried out in many possible geometries and configurations, and benefit almost any form of synthetic multi-filament termination method.

The potting compound within the auxiliary anchor might be a wax or some other meltable or soluble material. The potting compound in the cavity of the anchor itself might be a two-part epoxy. After the filament alignment is carried out and after the potting compound in the anchor has set, the wax in the auxiliary anchor portion could be removed by melting. The distal end of the anchor might then be subjected to a secondary operation such as grinding to produce a smooth surface finish. In this configuration the wax may alternately be cooled during the process to create the necessary hardness for translation, where the potting compound in the anchor cavity is used to permanently lock the tensioned strands in the cured state. As covered previously, any potting compound could undergo heating or cooling to achieve the desired cure state or viscosity for the inventive method. While epoxies and other cross linking materials tend to turn harder with heat, waxes and thermoplastics for example may require heat to lower initial viscosity, and may also benefit from cooling to provide the harder cure state or viscosity. While the majority of the disclosure examples focused on cross linking materials and processes, this is by no means limiting. The invention similarly applies to these non-cross-linking materials and processes that would relate to such materials for achieving the same outcome.

As one example, some of the high-strength synthetic filaments have relatively high melting temperatures. A thermoplastic potting compound having a relatively low melting temperature could be injected into an anchor cavity under pressure. The time for such a thermoplastic compound to transition from a liquid to a solid is short—often less than one minute. However, the inventive method could still be applied. Experimentation in this scenario might indicate that the optimum time to apply tension to the cable is only 15 seconds after the thermoplastic is injected. This would be much sooner than for a cross-linking potting compound, but the steps followed are the same.

A thermoset potting compound could also benefit from the of the inventive methods. The temperature applied to promote hardening in that case could be part of the controlling facts used to determine when the defined transition has taken place (and thereby determine the proper time for applying tension). As still another example a UV-cured potting compound could be employed. In that scenario the application of the UV light source could start a defined time cycle that would then dictate the application of tension.

Figure 17:
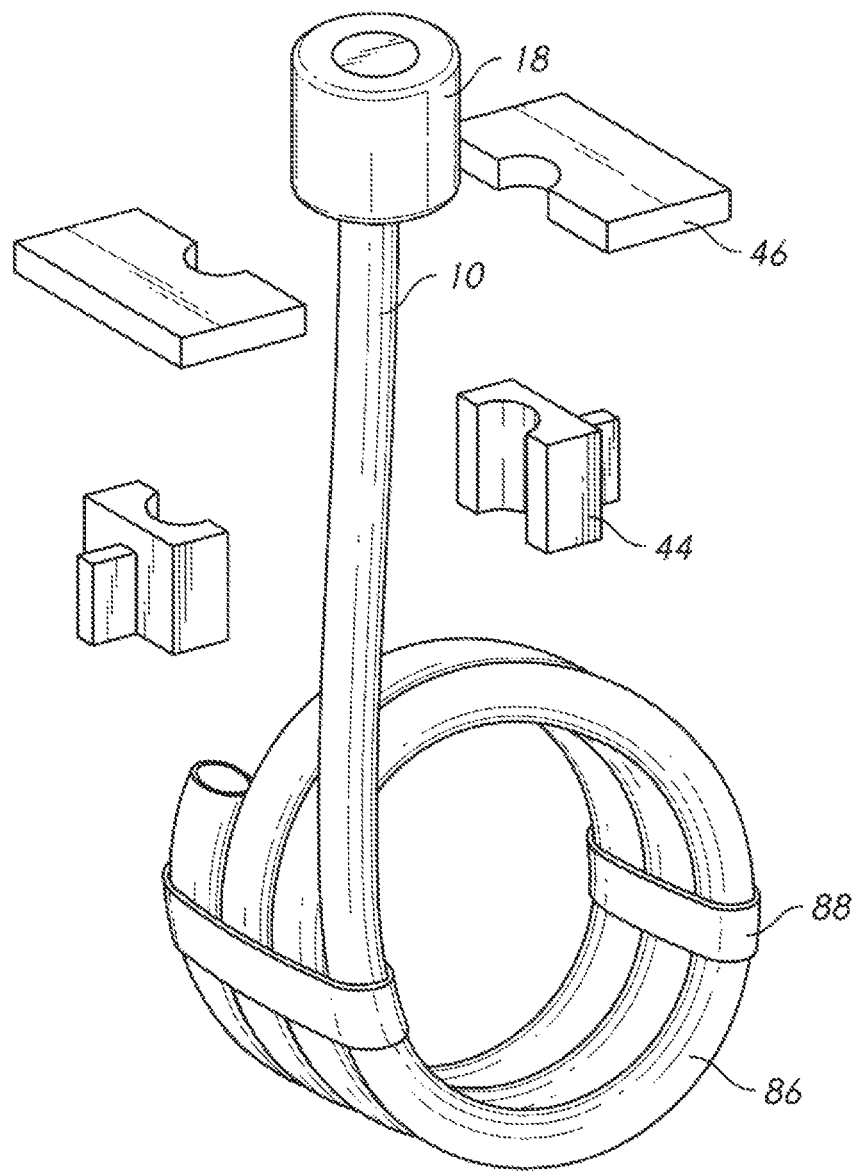
FIG. 17 is a perspective view, showing the use of the inventive method with a coil of cable having a single exposed end.

FIG. 17 illustrates how the inventive method will be used in many instances. Cable 10 is long. In order to make it convenient for handling the cable is formed into coil 86 and secured with binders 88. A free end of the cable is left out of the coil and it is this free end that will be the subject of the inventive process.

Anchor 18 is affixed to the end of the cable using potting compound in this example. Anchor clamps 46 secure the anchor in position. Cable clamps 44 clamp around a portion of the cable between anchor 18 and coil 86. The inventive translation process is then applied, either by holding the anchor steady and moving the cable, holding the cable steady and moving the anchor, or some combination of the two.

Once the potting compound is cured, the opposite end of the cable can be prepared for the addition of its own anchor. The anchor shown in FIG. 17 can then be wrapped up into a new coil, leaving a free portion of cable on the opposite end, with that free portion being the next site for the operation of the inventive process.

Figure 18A:
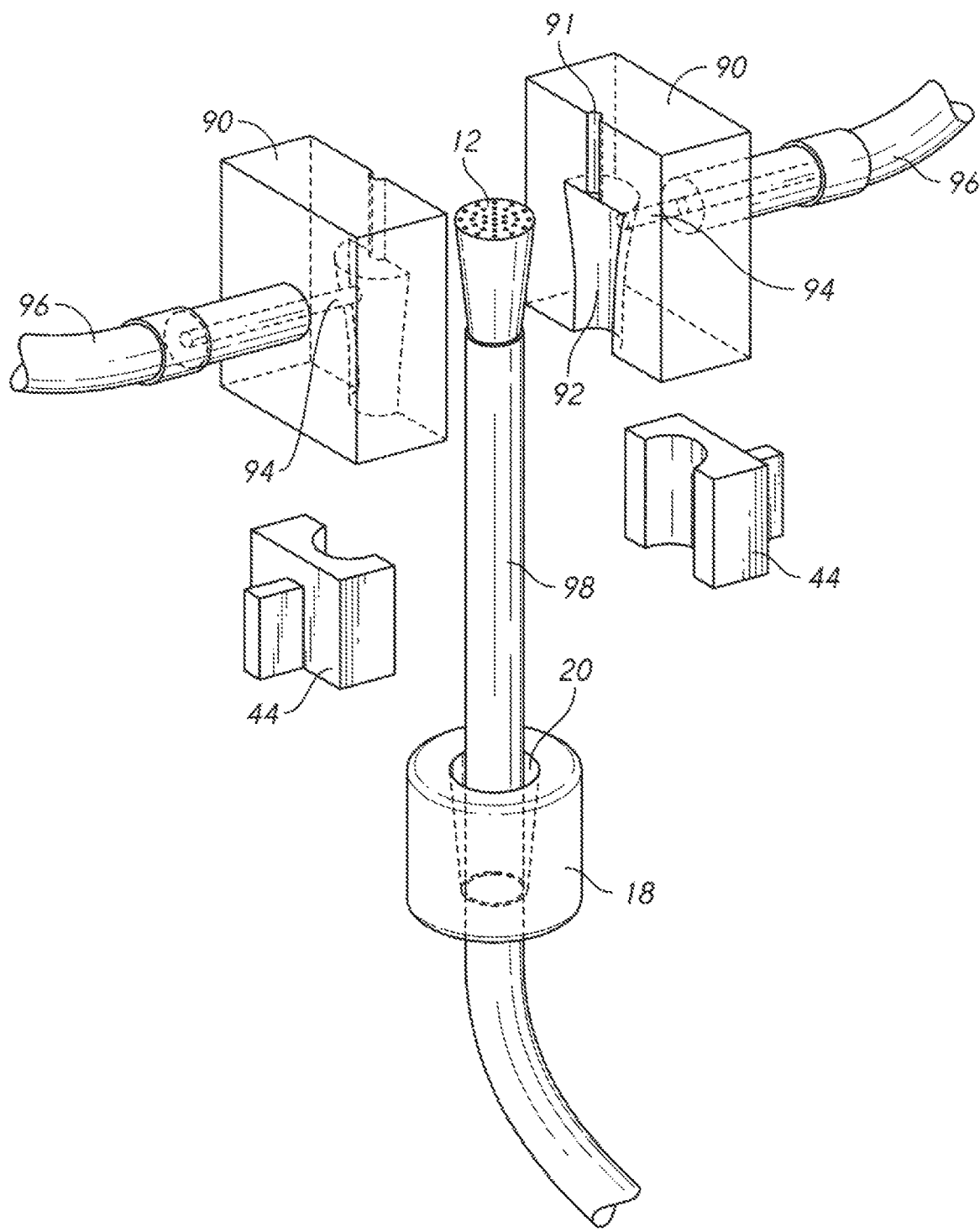
FIG. 18A is a perspective view, showing how the inventive method can be carried out using a mold to create the composite section of splayed filaments locked in potting compound.

FIG. 18A depicts an alternate embodiment of the inventive process. In the prior examples, the anchor itself included a cavity (generally an expanding cavity) and the splayed filaments were at some point placed in this cavity along with the potting compound in a liquid state. The liquid potting compound was then allowed to transition to a solid, with the inventive process being applied during the solidification. Once the inventive process was completed, the filaments remained locked within the anchor.

In the embodiment of FIG. 18A, the inventive translation process is carried out in a specialized mold. Then, once the potting compound has sufficiently cured, the mold is removed and the composite (molded) "plug" of filaments and solidified potting compound is transferred to a separate anchor. This process will now be described in more detail.

FIG. 18A shows splayed filaments 12 exposed at the end of a cable. The particular cable shown includes an encasing jacket 98. It is preferable to side anchor 18 a short length down the cable. A length of the jacket is then removed to expose splayed filaments 12. Two mold halves 90 are configured to clamp around splayed filaments 12. It is preferable to coat the mold cavities with mold release prior to performing the molding portion of the operation. Once the mold release has been applied, the two mold halves are clamped tightly around the splayed filaments, leaving the splayed filaments inside a mold cavity 92 in each mold half 90. The mold cavity may include a pliable sealing collar or gasket near its lower exit ("lower" being understood in the context of the orientation shown in the view).

Liquid potting compound is pumped through a feed line 96 in each mold and injected onto the mold cavity via one or more injection sprues 94. The liquid potting compound infuses through the splayed filaments and completely immerses the mold cavity (the mold cavity being made up of the two unified mold cavity halves 92. Vent 91 is preferably provided to allow air within the mold cavity to escape as the liquid potting compound fills the mold cavity. Readers wishing to know more about the different ways that liquid potting compound can be injected into a mold cavity are referred to my own U.S. Pat. Nos. 6,957,475, 7,076,853, 8,048,357, and 8,236,219, which are hereby incorporated by reference.

Once the injection of the liquid potting compound is complete (or otherwise nearing completion), the inventive process is applied as explained previously. Cable damps 44 are secured around the cable. Then, at the occurrence of the defined transition, tension is applied to the cable and a controlled translation of the cable is made. The mold itself acts as a sort of fixed anchor. Thus, it is possible to create the desired translation by pulling the two cable clamps 44 (locked around the cable) downward. As for all the other examples provided, it is also possible to create the desired translation by holding the cable clamps steady and moving the mold.

Once the controlled translation plan is complete and the potting compound has cured as a solid, the two mold halves are opened. A solid composite of splayed filaments 12 and solidified potting compound will then be revealed. The assembly of the cable and anchor 18 is then removed from the mold. Anchor 18 is then moved along the cable and over the composite including splayed filaments 12. It is preferable for the shape of cavity 20 in anchor 18 to closely resemble the shape of the mold cavity. While in most cases a closely-matched cavity shape is preferred, in other cases it is preferable to create a slight variation between the shape of the molded composite of potting compound/fibers and the cavity within the anchor. As an example, it can be desirable to make the throat region of the cavity in the anchor somewhat oversized to minimize compressive stresses in this area when the cable is placed under tension.

The reader should note that it is not necessary to slip the anchor down the cable prior to starting the molding process. The anchor may be slipped over the cable from the opposite end of the cable if that is desired. In still other cases the anchor itself may include multiple cavities or multiple pieces that interlock to create a complete assembly.

The reader should also note that the invention is not limited to the radially symmetric shapes that have been illustrated. It is also possible to apply the inventive method to fan-shaped cavities, oval-shaped cavities, and completely asymmetric cavities.

The mold shape shown in FIG. 18A will be impractical in many instances because it is difficult to close the mold halves together without pinching some of the splayed filaments between the mating faces of the mold halves. In addition, it is difficult to uniformly splay the filaments apart while they reside within mold cavity 92. A solution to these concerns is provided in a revised mold configuration depicted in FIGS. 18B through 18E.

Figure 18B:
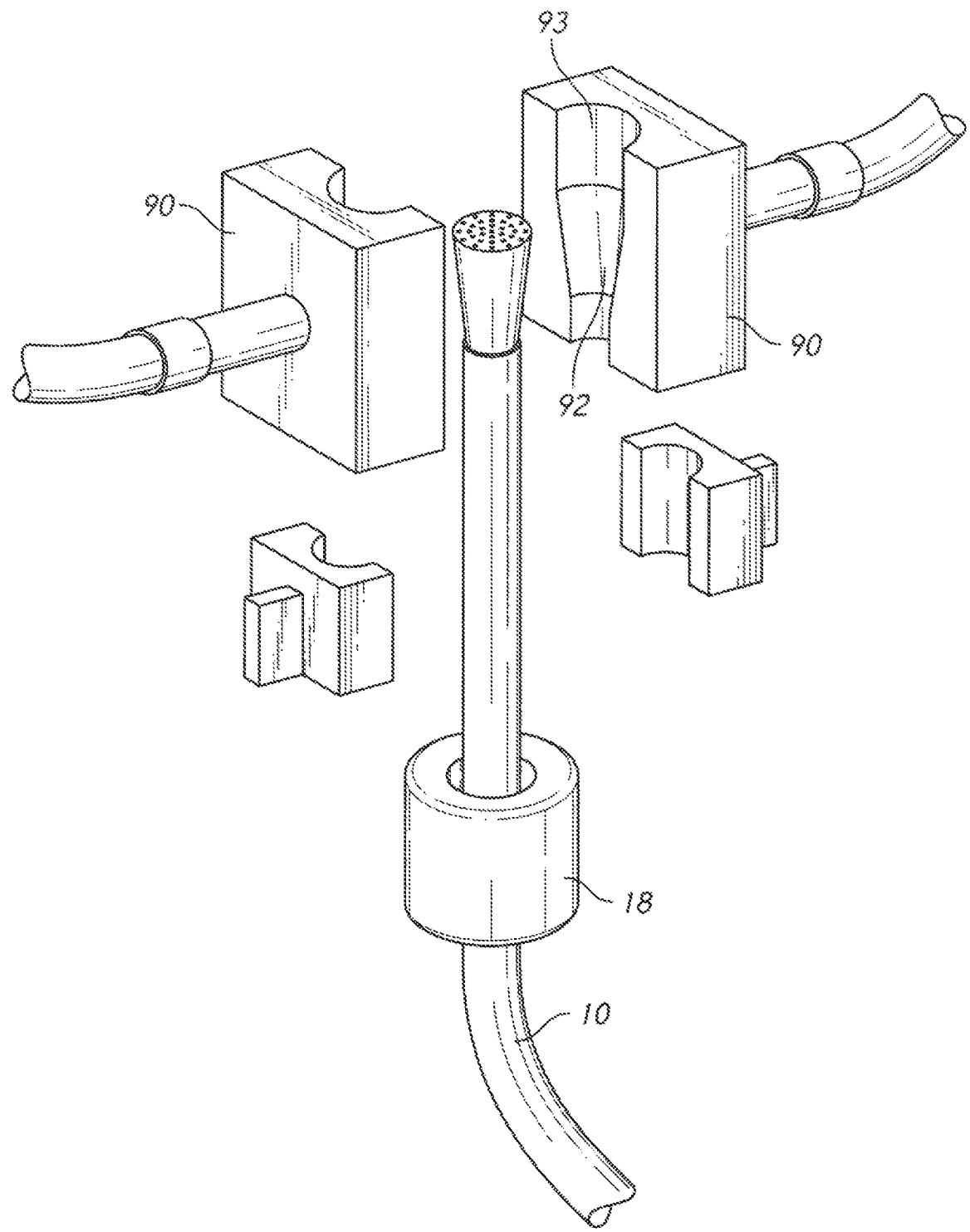
FIG. 18B is a perspective view, showing the use of a mold with an open top.
Figure 18C:
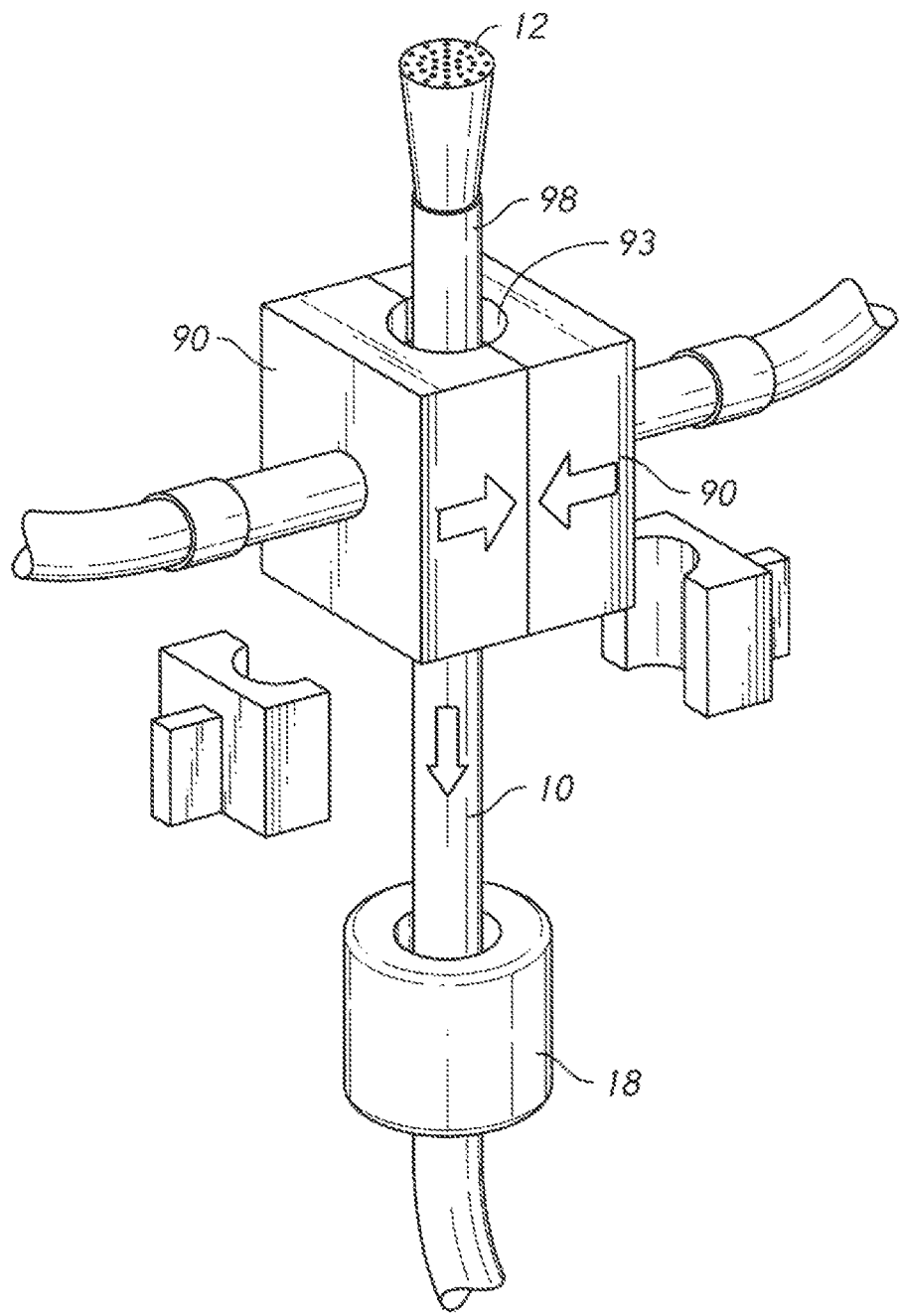
FIG. 18C is a perspective view, showing the operation of the embodiment of FIG. 18B.
Figure 18D:
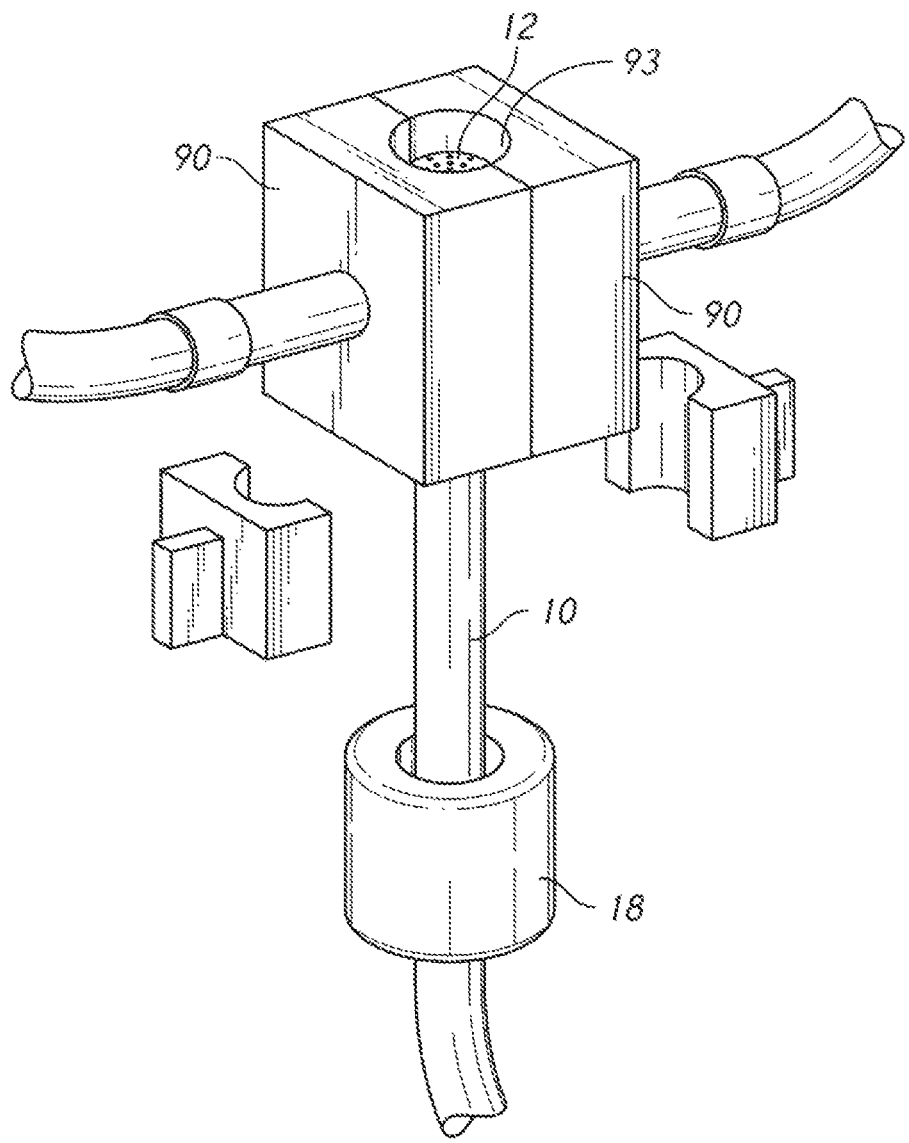
FIG. 18D is a perspective view, showing the operation of the embodiment of FIG. 18B.
Figure 18E:
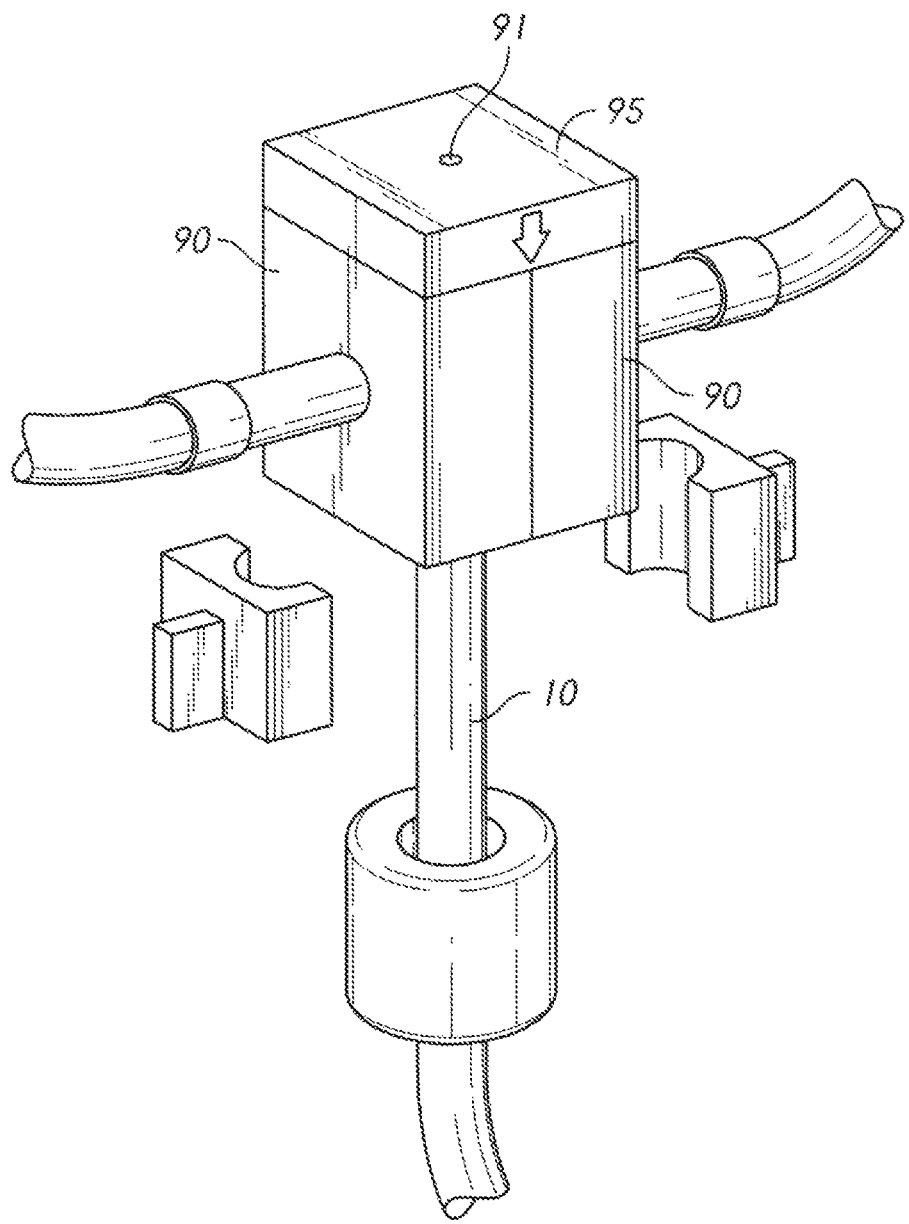
FIG. 18E is a perspective view, showing the operation of the embodiment of FIG. 18B.

FIG. 18B depicts an embodiment in which the two mold halves 90 have been modified to include open top 93 (an enlarged passage leading from outside the mold and into mold cavity 92). FIGS. 18C-18E depict how this configuration is used. In FIG. 18C, the reader will note that the cable has been moved upward (or the mold halves moved downward) so that splayed filaments 12 lie well above the two mold halves 90 when the mold halves are clamped together around jacket 98 (or around the cable itself if no separate jacket is included).

Cable 10 is then pulled downward—as indicated by the arrow—in order to pull splayed filaments 12 down through open top 93 and into the mold cavity within the closed mold. FIG. 1BD shows the assembly after the cable has been translated downward. The reader will observe how splayed filaments 12 are accessible through open top 93. This allows access to physically manipulate the filaments in order to provide a suitable and uniform splaying.

It is possible to inject the potting compound in the configuration shown in FIG. 18D, with the injection process stopping once the liquid potting compound infuses over the top of the splayed strands. It is also possible to introduce liquid potting compound through the open top 93. In the case of injected potting compound, it is preferable to provide a covering for the mold. FIG. 18E shows a sealing cap 95 in place over the open mold top. This is clamped in place during the injection cycle. Vent 91 vents air from the mold cavity as the mold cavity fills with liquid potting compound. While the process is depicted with the open top of the mold facing upward, once the covering is in place the process can be carried out in any desired orientation.

Figure 18F:
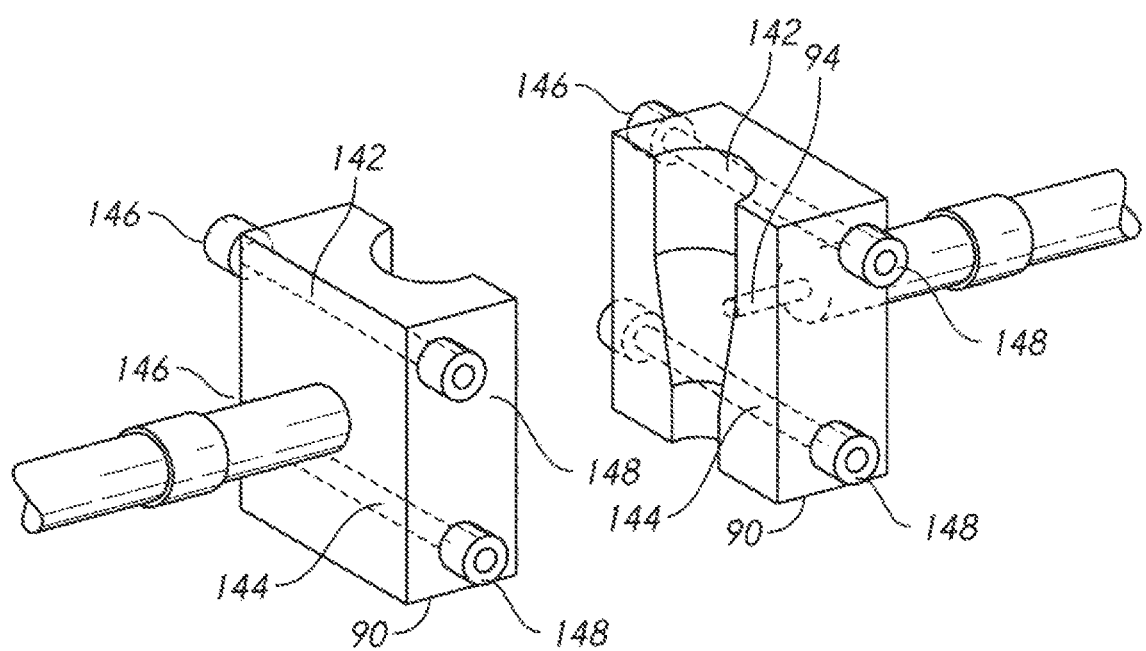
FIG. 18F is a perspective view, showing how heating and/or cooling elements can be used in a mold configured to carry out the inventive method.

FIG. 18F shows another embodiment of the mold depicted in FIG. 18E. Each mold half 90 includes heat transfer passages 142, 144. Each heat transfer passage includes an inlet 146 and an outlet 148. A heat transfer fluid can be pumped through these passages to regulate the temperature of the mold as desired. In addition, the temperature in different portions of the mold can be regulated independently. As an example, the temperature near the throat of the mold cavity could be maintained at a higher temperature than the rest of the cavity in order to generate a desired distribution of solidification within the potting compound. Temperature changes could also be used to drive the onset of the defined transition. For instance, elevating the temperature would tend to accelerate the solidification process. In some embodiments heating can be applied, to one portion of the mold while cooling is applied to another. The use of a pre-molding process allows a more sophisticated temperature control scheme that can be economically realized in the anchor itself.

The broad inventive method of applying tension during the transition of the potting compound from a liquid to a solid state can be applied to many different types of tensile members and terminations. The prior examples have focused primarily on the application of a single anchor to a cable. However, as should be understood throughout this disclosure, the invention applies equally to terminations including multiple anchors attached to the ends of multiple strands. The invention offers benefits at the fiber level, the strand level, and the cable level. The invention can—in the right circumstances—eliminate the need for length and load balancing hardware.

Figure 19:
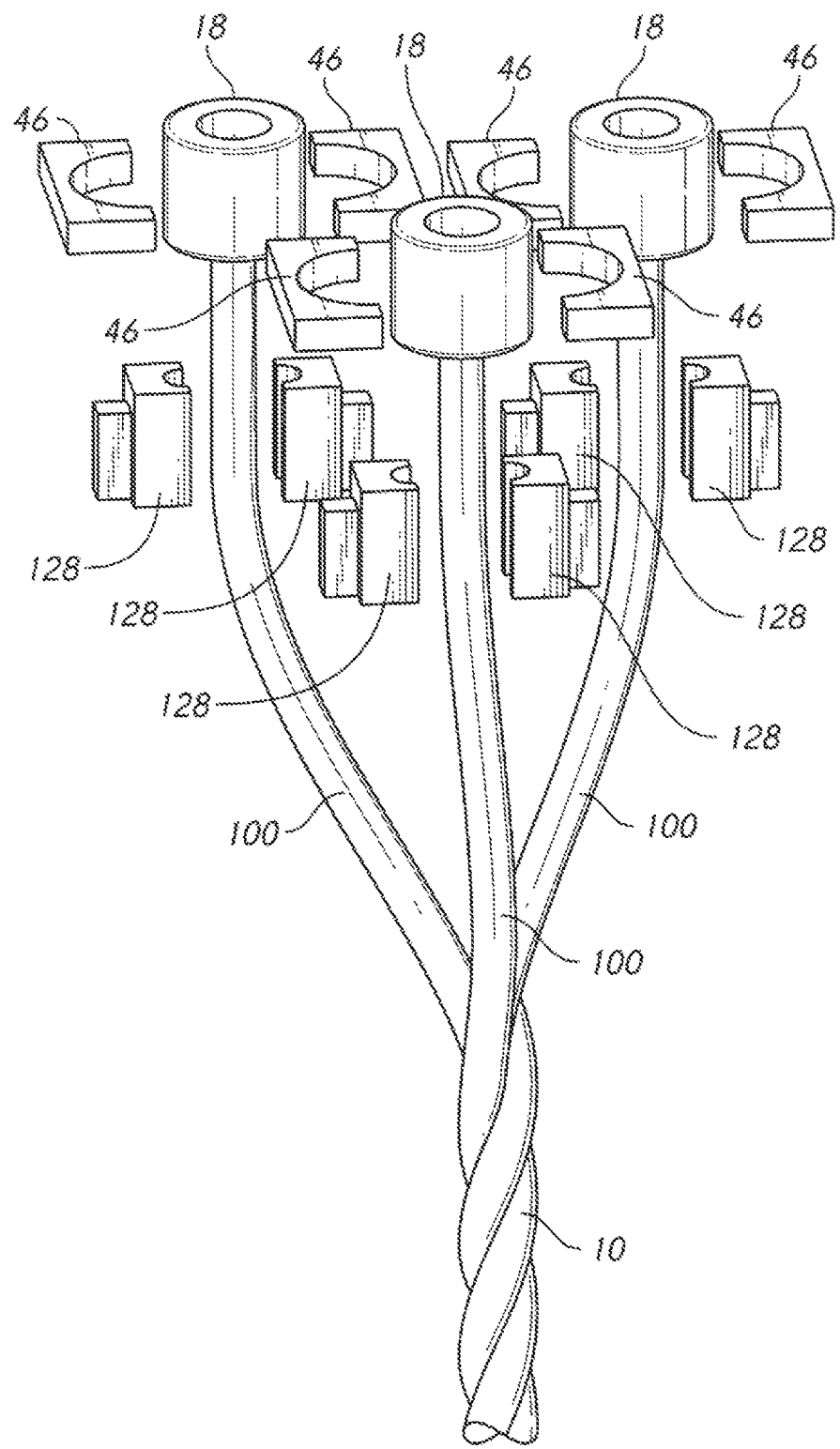
FIG. 19 is a perspective view, showing an example of how the inventive method can be applied to a multi-stranded cable using multiple anchors gathered into a collector.

FIG. 19 shows an application of the invention to a cable with a multi-stranded termination including multiple anchors. The cable 10 in FIG. 19 comprises three separate strands that are twisted or braided into a particular configuration. Most real-world cables would include 8 or more strands. A 3-stranded cable is shown for visual simplicity. The ends of the strands are separated from each other in order to provide room to attach an anchor 18 as shown. It is preferable in this scenario to monitor for a defined transition in each individual anchor. Anchor clamps 46 are clamped onto each anchor. Strand clamps 128 are clamped around each individual strand 100. Upon the occurrence of a defined transition In each anchor the strand clamps associated with the particular strand in that particular anchor are moved to create the desired translation as the potting compound transitions to a solidified state (In all cases the reader should understand that the invention is carried out via relative motion between the anchor and the strand. One may create this relative motion by moving the anchor, moving the strand, or some combination of the two. Thus, when any portion of this disclosure refers to moving the anchor or the strand, the reader should bear in mind that it is the relative motion between the anchor and the strand that is the important aspect) This example includes all the variation described previously for applications having only a single anchor.

Figure 20:
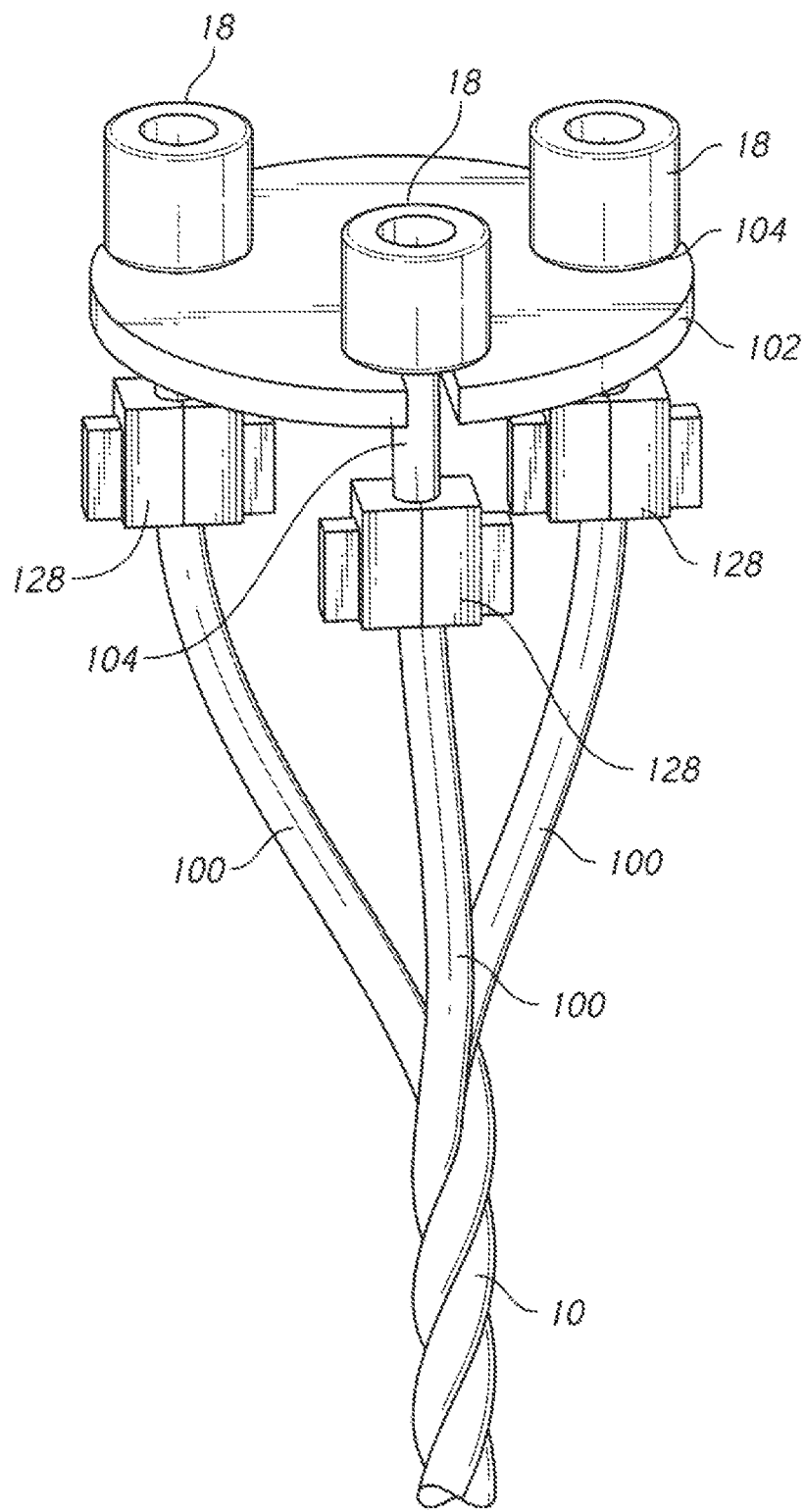
FIG. 20 is a perspective view, showing the use of a single securing device to hold multiple anchors while individual cable clamps are applied to each strand of a multi-stranded cable.

FIG. 20 shows a variation of the assembly shown in FIG. 19. In FIG. 20, a single anchor plate 102 is used to secure the three anchors 18. Any suitable anchor holding fixture can be substituted for anchor plate 102. In the example shown, three radial slots 104 are provided so that the user can admit the cable laterally into the anchor plate while the anchors rest on top of the anchor plate. While not required, it is preferable to make the anchor positions similar to the positions they will occupy in use. As stated previously, the invention can be carried out in any desired orientation and it is common to use an orientation that is inverted with respect to the one shown in FIG. 20.

A pair of strand clamps 128 is affixed to each cable strand as shown. When the defined transition occurs in a particular anchor, the associated pair of strand clamps is activated to create the desired translation of the particular strand. In some cases it is desirable to apply tension at a distinct time for each individual strand. In other cases it is desirable to apply tension to all the strands at the same time. In the latter case force may be applied to the cable as a whole.

There are advantages to applying tension to the cable as a whole when the potting compound in each individual anchor cavity has reached the defined transition. Pulling on the cable as a whole will cause some strands to translate more than others. This produces load equalization on a strand-to-strand level. In such a case the application of the inventive method produces; (1) fiber alignment within each cavity in each anchor; (2) fiber-to-fiber load equalization within each cavity in each anchor; and (3) strand-to-strand load equalization in the cable as a whole.

When using the approach of applying tension to the cable as a whole, it is generally preferable for the anchors and strands to have a geometric relationship (during the application of the tension) that is similar to the geometric relationship that will exist when the cable is put into use (or as nearly so as practicable).

When using the approach of applying tension to the cable as a whole, it is preferable for the defined transition to occur over a relatively long period of time, since it may be difficult to initiate potting compound infusion for multiple anchors at precisely the same time. A complete cure time for a typical anchor may be 12 hours. It is advantageous to provide a "window" of time for the initiation of tension that is 5 minutes or longer. This will allow for some variation in the process start time for each anchor. If faster-transitioning compounds are used, the initiation of the process should be controlled more precisely (such as by applying potting compound to all the anchors simultaneously).

Figure 27:
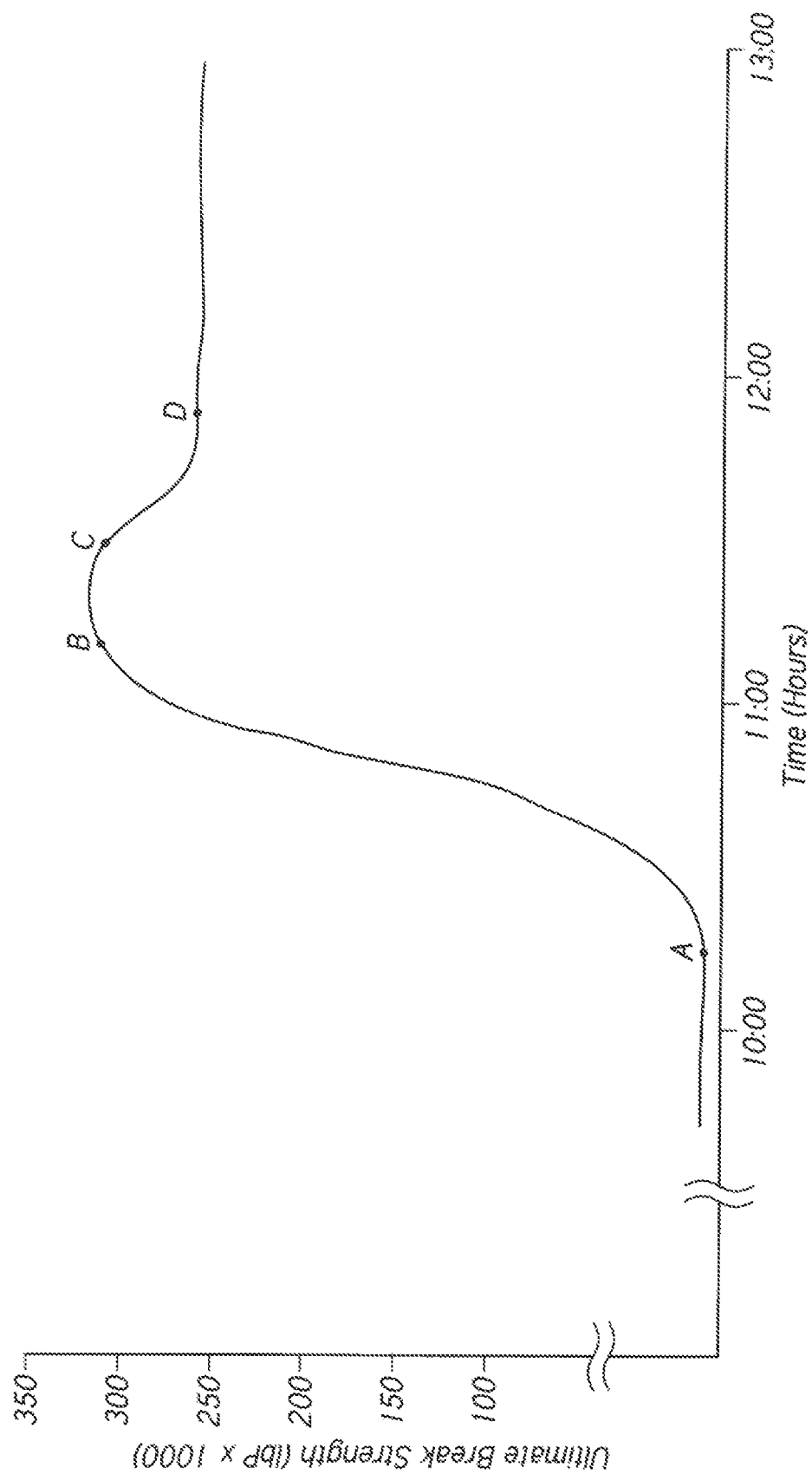
FIG. 27 is a plot of cable break strength versus the time at which the inventive application of tension commences.

In addition, given a practical tolerance on the curing rate of the potting compound, it is preferable to provide a combination that produces a "flat" peak to the strength versus time curve so that some error can be accommodated. FIG. 27 depicts this phenomenon. The Y-axis shows the ultimate break strength of a single strand and its attached anchor once all the potting compound is fully cured. The X-Axis shows the time between the commencement of the process with the infusion of the liquid potting compound and the time that tension is applied to the strand.

Prior to Point A the break strength is low because the application of tension occurred too early and the strand simply pulled fee of the anchor. To the right of Point A the break strength is increasing. Between Points B and C a relatively constant peak in break strength is achieved. Between Points C and D the break strength is decreasing. To the right of Point D the break strength is constant. The flat line to the right of Point D means that tension was applied after the potting compound was cured sufficiently to immobilize the strands—meaning that the application of the inventive method had no effect and the result is the same as for the prior art.

The inventive method is preferably applied between points B and C. In the example of FIG. 27, approximately 15 minutes exists between Points B and C. The process can be applied anywhere in this interval with little effect on the ultimate break strength.

Figure 21:
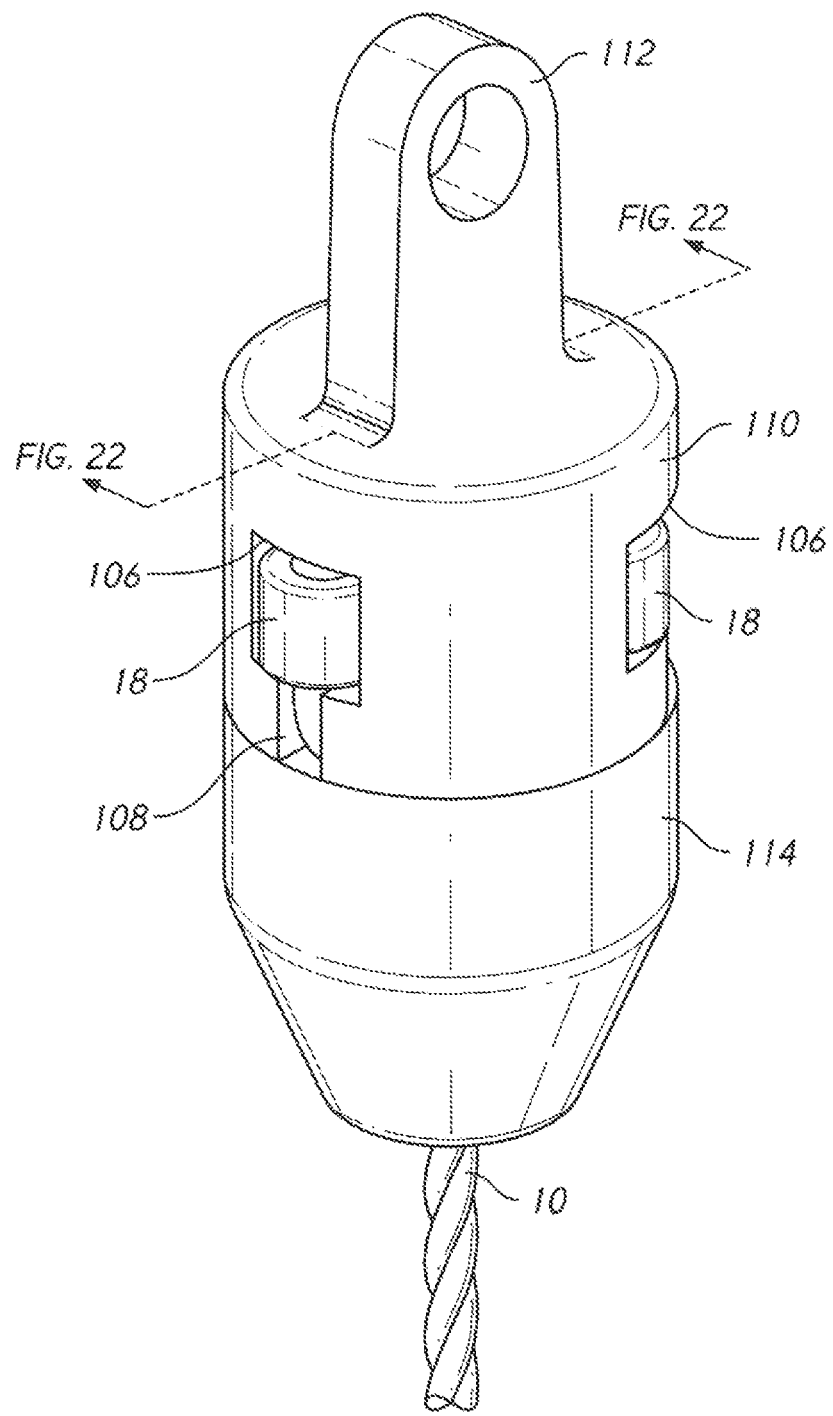
FIG. 21 is a perspective view, showing how multiple anchors on a multi-stranded cable can be united into a single collector.

When multiple anchors are attached to the end of a cable (such as by attaching an anchor to each cable strand) it is often desirable to reunify the anchors in a complete assembly. This can be done in many ways. FIG. 21 shows one exemplary assembly. The three anchors 18 are connected to collector 110. The collector then transfers the load of the cable to an external component via load transferring element 112. In this particular version of a collector, each anchor 18 rests in a pocket 106 and the strand coming out the bottom of each anchor rests in a slot 108. Countless other configurations exist for uniting multiple anchors into a unified collector, and the invention is by no means limited to any particular approach.

Figure 22:
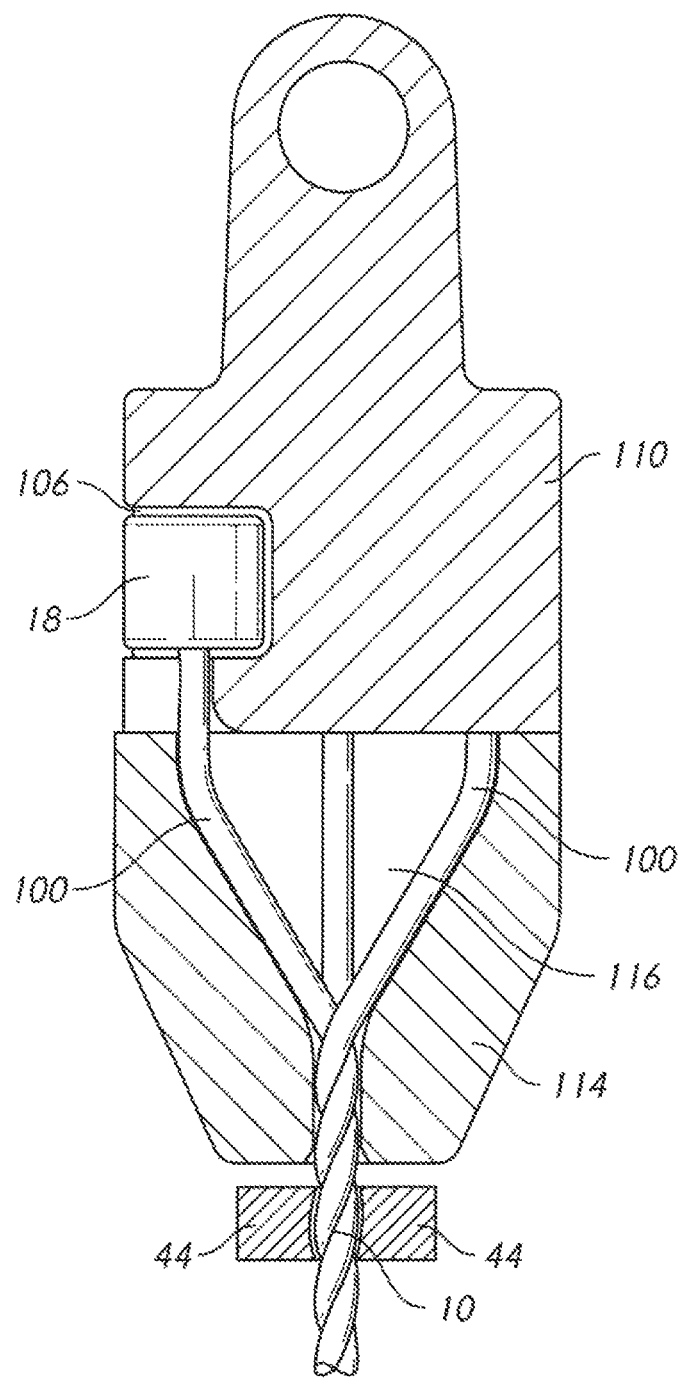
FIG. 22 is a sectional elevation view of the assembly of FIG. 21, also showing how tension can optionally be applied to the cable as a whole in carrying out the inventive process.

Alignment fixture 114 is provided to guide the strands from the freely flexing portion of cable 10 into collector 110. FIG. 22 provides a sectional view through the assembly of FIG. 21. Alignment fixture 114 is preferably attached to collector 110, such as by bolting the two components together.

Central cavity 116 provides an inward facing surface that guides the path of each strand. The reader will observe how anchor 18 sitting in pocket 106 is configured to transmit tensile loads from the cable to collector 110.

The example of FIG. 22 illustrates another way to apply the present inventive method: Potting compound transition tension can be applied during the cure of the potting compound while the anchors 18 are united with the collector 110. In this approach the potting compound is introduced to the anchor cavities and the anchors are actually united with the collector (and possibly alignment fixture 114 is added as well). The order of these operations is not necessarily important, so long as the anchors are united with the collector at the time of the application of the potting compound transition tension.

Once the defined transition begins to take place, a device such as cable clamps 44 may be used to apply the potting compound transition tension to the cable as a whole or to the individual cable strands. As a result, the inventive method produces improvement in: (1) fiber alignment within each cavity in each anchor; (2) fiber-to-fiber load equalization within each cavity in each anchor; and (3) strand-to-strand load equalization in the cable as a whole. Further, all these improvements are made while accounting for the variations in the geometry of the anchor-to-collector connections (as well, as any geometric variations in the alignment fixture).

Cable clamp 44 can be applied in this scenario to provide tension to the cable as a whole while the potting compound within the anchors is undergoing the defined transition. When applying tension to the cable as a whole, it is preferable to accommodate a greater translation. The anchor cavities can be provided with a more gently sloping profile so that a wider range of translations can be accommodated (from anchor to anchor) without significantly affecting the break strength of the potted termination in any particular anchor. Where a single cable of 50 mm in diameter may achieve the desired properties with a translation of only 10 mm (in a direction parallel to the cable's central axis), this will not likely be a sufficient translation for a cable made of 12 strands and having 12 separate anchors. In the latter case a translation of 20 to 40 mm may be needed.

The translation may take place as one continuous motion or it may take place in many smaller stages. The reader wishing to better understand the impact of balancing the load within a multi-stranded cable is referred to commonly owned U.S. Pat. No. 9,835,228, which is hereby incorporated by reference.

To retain proper load-sharing in the cable, conditions should ideally be carefully controlled to manage the potting compound cure and strand tension during the application of the potting compound transition tension. For example, if one anchor is curing at a faster rate and translation occurs too late in the cycle, the performance of that particular anchor will be reduced. Sophisticated methods of applying the tension are needed in some embodiments, such as long and slow translation, staged translation, stepped translation, or pulsed translation.

With a sufficient ramp-up in strand loading, a well-balanced cable can be produced without resulting to length adjustment devices on each anchor-to-collector interface (such as a threaded shaft, adjusting shims, etc.). The elimination of these length adjustment devices saves cost and reduces complexity. In addition, the inventive method allows the use of multiple-cavity anchors as opposed to multiple anchors that have to be joined together using a collector.

Figure 25A:
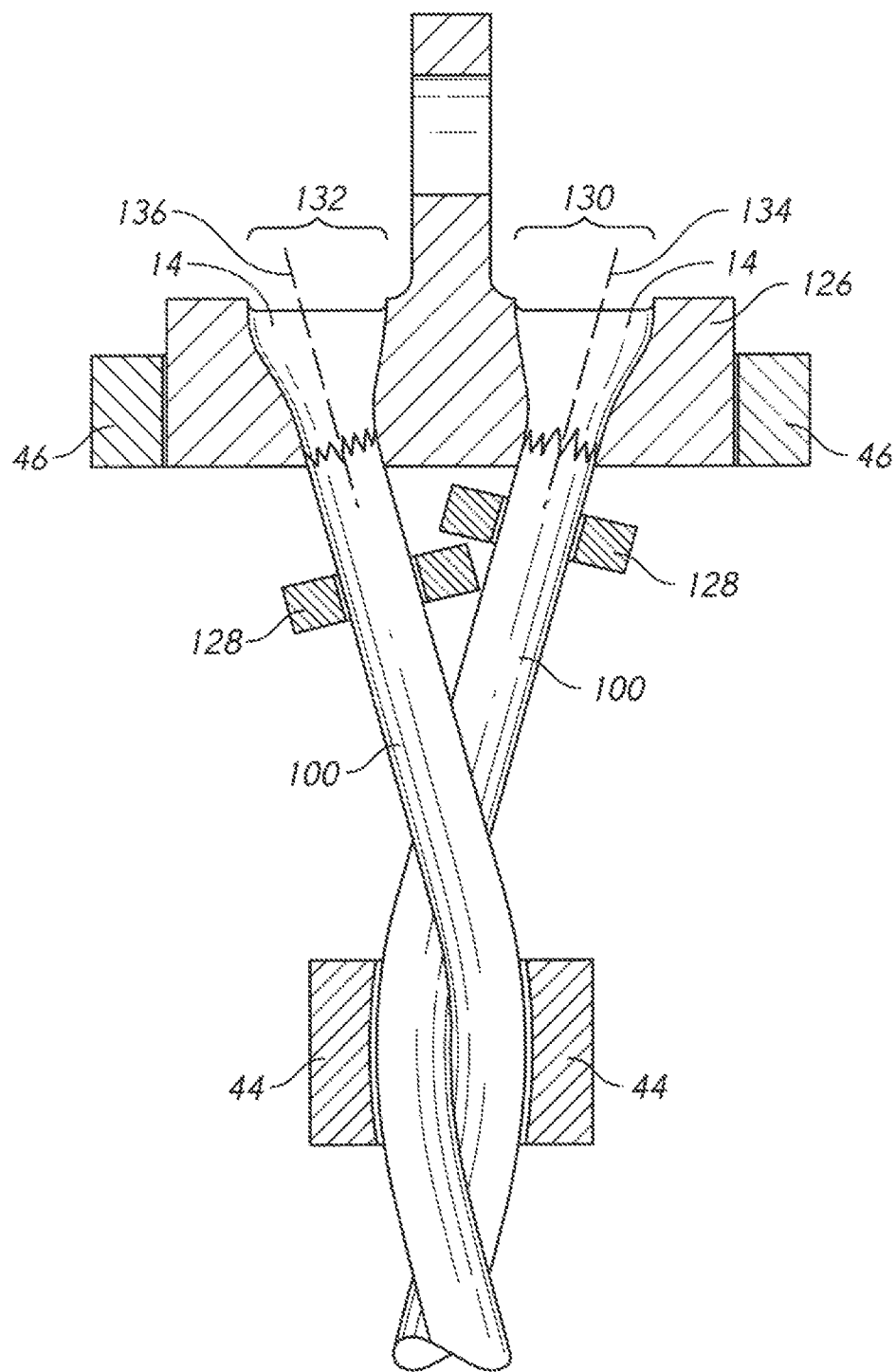
FIG. 25A is a sectional elevation view, showing a double cavity anchor whereby two individual strands can be locked into a single anchor, along with other elements suitable for carrying out the present inventive method for this type of anchor.

FIGS. 25A-25E illustrate the application of the inventive method to multiple-cavity anchors. FIG. 25A shows a very simple version of a single anchor containing multiple potted terminations. In this simple depiction the cable has only two strands. However, in an actual case, the cable would likely have 4, 8, 12, or more strands. In larger cables such as used for offshore mooring, this may include over 20 strands. These strands will tend to diverge from the arrangement ("lay") within the cable itself as they approach and enter the multi-cavity anchor. This divergence is a practical consideration to allow sufficient room for the formation of the potted regions (the strands lying immediately adjacent to each other with very little intervening space is the lay within the cable itself). A separate "nose piece" (a strand guiding and protecting component) is often added to surround and protect the length of strands where they diverge to enter the multi-cavity anchor. This separate nose piece is not shown in FIG. 25A, but it would ordinarily be attached to the multi-cavity anchor. A representative nose piece is shown as alignment fixture 114 in FIG. 22 of this disclosure. Another exemplary nose piece is illustrated as element 64 in FIG. 1 of commonly-owned U.S. patent application Ser. No. 14/693,811. Application Ser. No. 14/693,811 is hereby incorporated by reference. The separate nose piece often has the additional advantage of urging the strands inward toward the position they will occupy in the free-running portion of the cable, thereby shortening the overall length of the termination.

Multiple cavity anchor 126 includes first cavity 130 and second cavity 132. The central axes 134, 136 of these two cavities are inclined to accommodate a smooth transition to the helical twist of the two strands 100 in the cable itself. Angular offsets such as these may be included depending on the lay of the cable. In other embodiments the cavities will be aligned with the central axis of the cable. Anchor clamp 46 holds the anchor in place. There are different approaches available to apply the inventive method to the terminations once the defined transition occurs. One approach is to provide a strand clamp 128 for each individual strand. In this instance the two strands might undergo the application of tension and resulting translation at different times. Another approach is to provide a single cable clamp 44 that applies tension/translation to multiple strands at the same time.

The reader is referred to commonly-owned patent application Ser. No. 15/710,962 for an explanation of how anchor cavities such as shown in FIGS. 25A-F can be effectively infused with liquid potting compound. This co-pending application is hereby incorporated by reference.

The application of the inventive process allows strand-to-strand length adjustment without having to adjust the location of each cavity in the multiple cavity anchor. This advantage eliminates supplemental devices and processes.

Figure 25B:
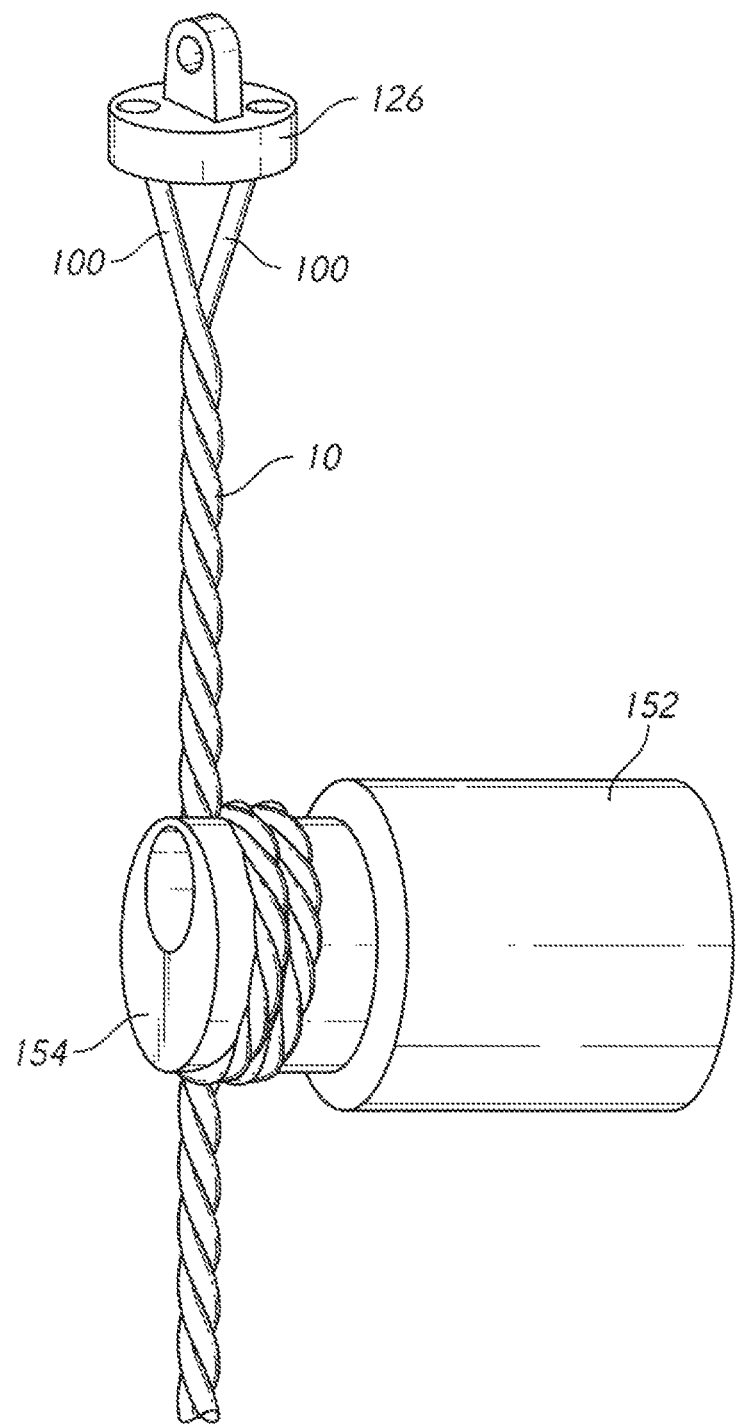
FIG. 25B is a perspective view, showing the use of a capstan to regulate tension applied to a cable.

As discussed previously, the term "cable clamp" should be understood to encompass many different devices that can apply tension to a cable. Yet another approach is shown in FIG. 25B. In the version of FIG. 25B, cable 10 is passed around capstan 150 (at a sufficient distance from double cavity anchor 126 to provide a straight portion leading to the double cavity anchor). Drive motor 152 turns capstan 150 in a controlled fashion in order to apply tension and translation on the terminations within double cavity anchor 126. The use of a driven or tensioned capstan (or similar known pulling device) could be applied to the other disclosed embodiments as well.

Figure 25C:
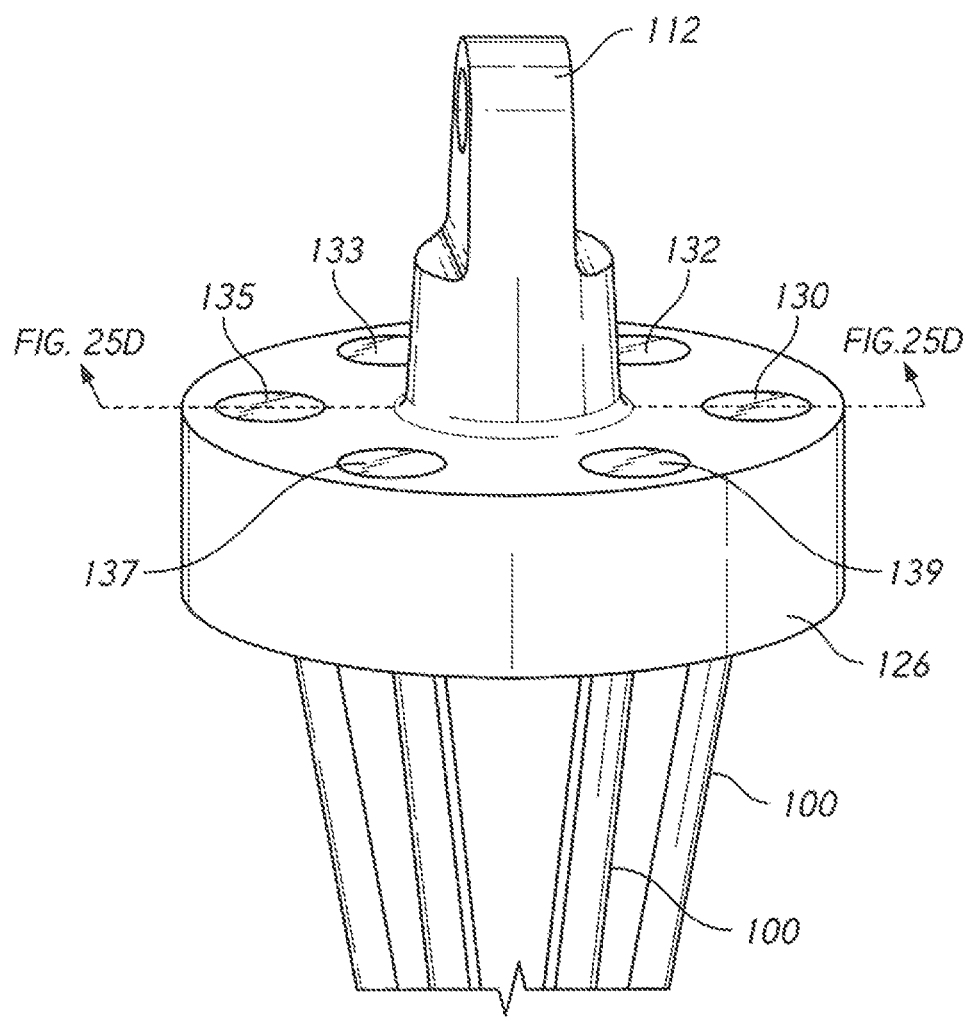
FIG. 25C is a perspective view, showing a multiple cavity anchor having six cavities.

FIG. 25C shows a multiple cavity anchor 126 configured for use with a cable having six strands 100. The anchor shown has six separate strand cavities 130, 132, 133, 135, 137, and 139. Each strand of the cable shown is connected to the anchor using potting compound in the relevant strand cavity. A single load transferring element 112 (in this case an eye) is used to connect the multiple cavity anchor to an external component. As an example, the anchor could be connected to an external clevis using a transverse pin.

Figure 25D:
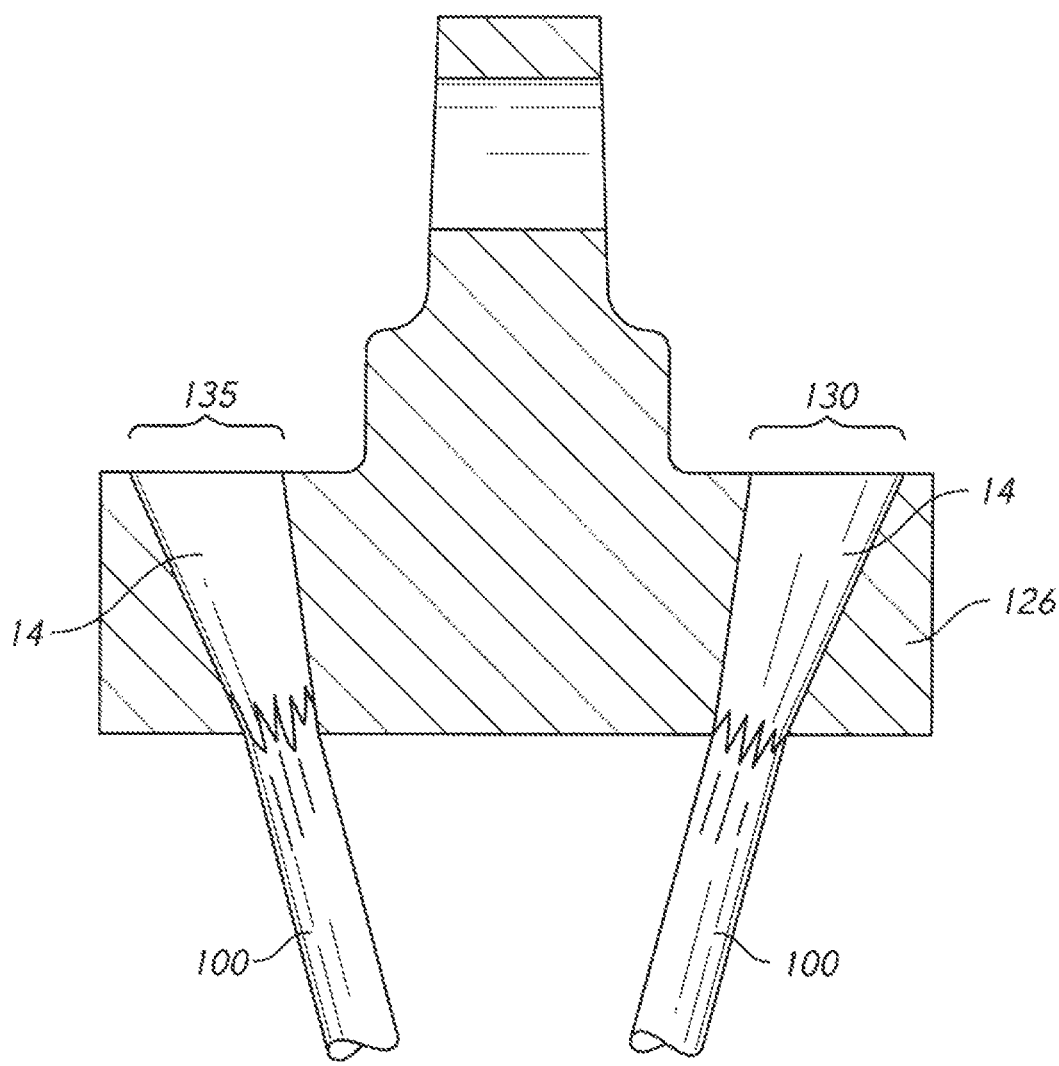
FIG. 25D is a sectional view, showing internal details of the anchor of FIG. 25C.

FIG. 25C contains a section view "callout" referencing FIG. 25D. FIG. 25D provides a sectional elevation view through the exemplary multiple cavity anchor of FIG. 25C. The section passes through first cavity 130 and fourth cavity 135. Each cavity contains a potted region 14 that locks a particular strand 100 in place.

Figure 25E:
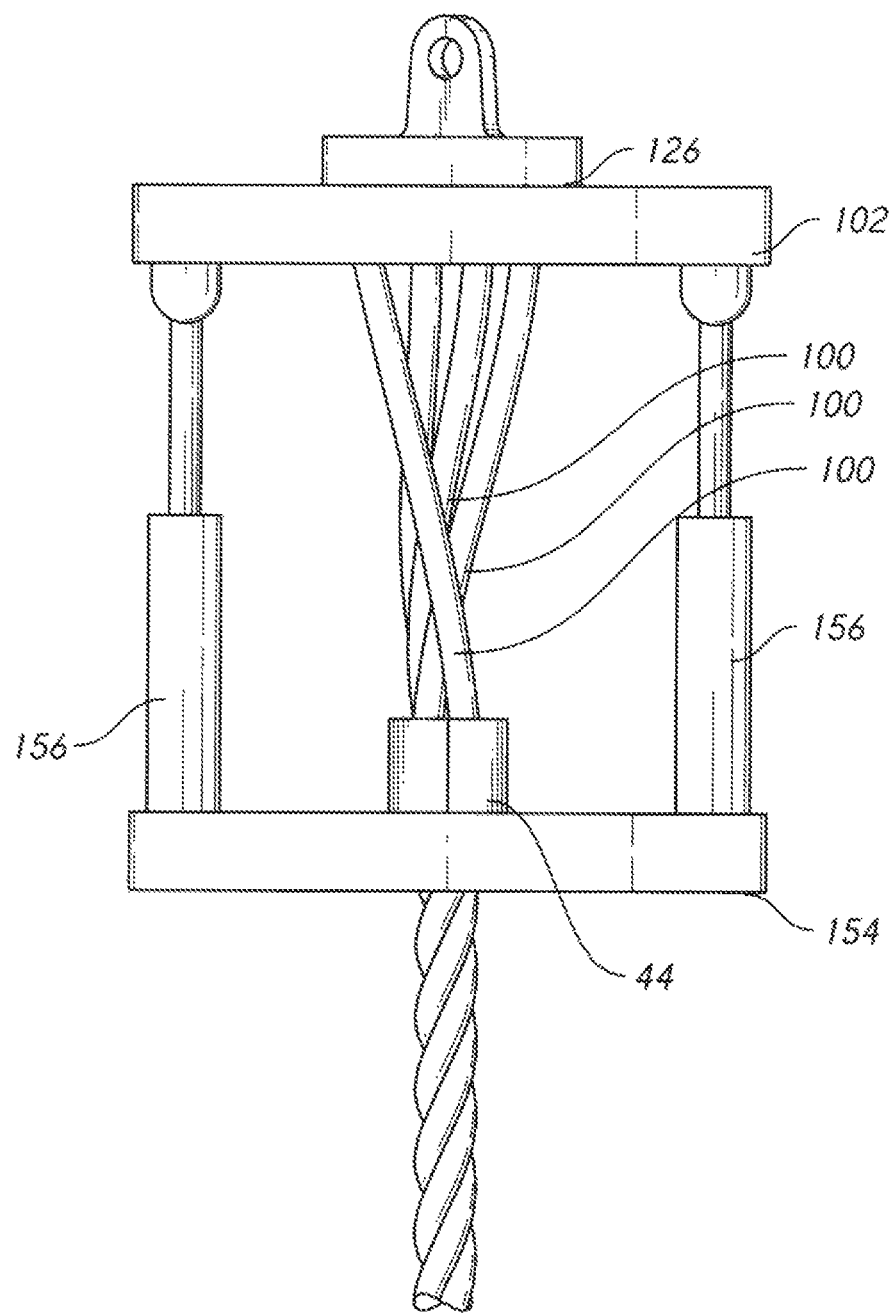
FIG. 25E is an elevation view, showing a device that is useful for producing relative motion between a multiple cavity anchor and a cable clamp

The inventive method of applying potting compound transition tension can be applied using a variety of fixtures and other devices. FIG. 25E illustrates an exemplary fixture that can be used with the multiple cavity anchor of FIGS. 25C and 25B. Anchor plate 102 engages and secures multiple cavity anchor 126. A passage through the middle of the anchor plate allows the strands 100 to pass through.

Clamp plate 154 is separated from anchor plate 102. The clamp plate also contains a passage allowing the strands to pass through. Cable damp 44 is clamped on the cable as a whole. The cable clamp is attached to clamp plate 154. Actuators 156 are connected between anchor plate 102 and clamp plate 154. The actuators are used to urge the two plates apart—thereby placing tension on the cable and applying the present inventive method. The use of actuators allows fine control of the tension applied via variations in the force applied. As an example—if the actuators are hydraulic cylinders—variations in the hydraulic feed pressure can be used to vary the force applied. Displacement is also easy to measure since there are many existing devices that can be used to measure things like rod extension in a hydraulic cylinder (though the measurement of displacement is obviously not limited to hydraulic cylinders). Many different devices and techniques could be used to apply a separating force between anchor plate 102 and damp plate 154.

Figure 26:
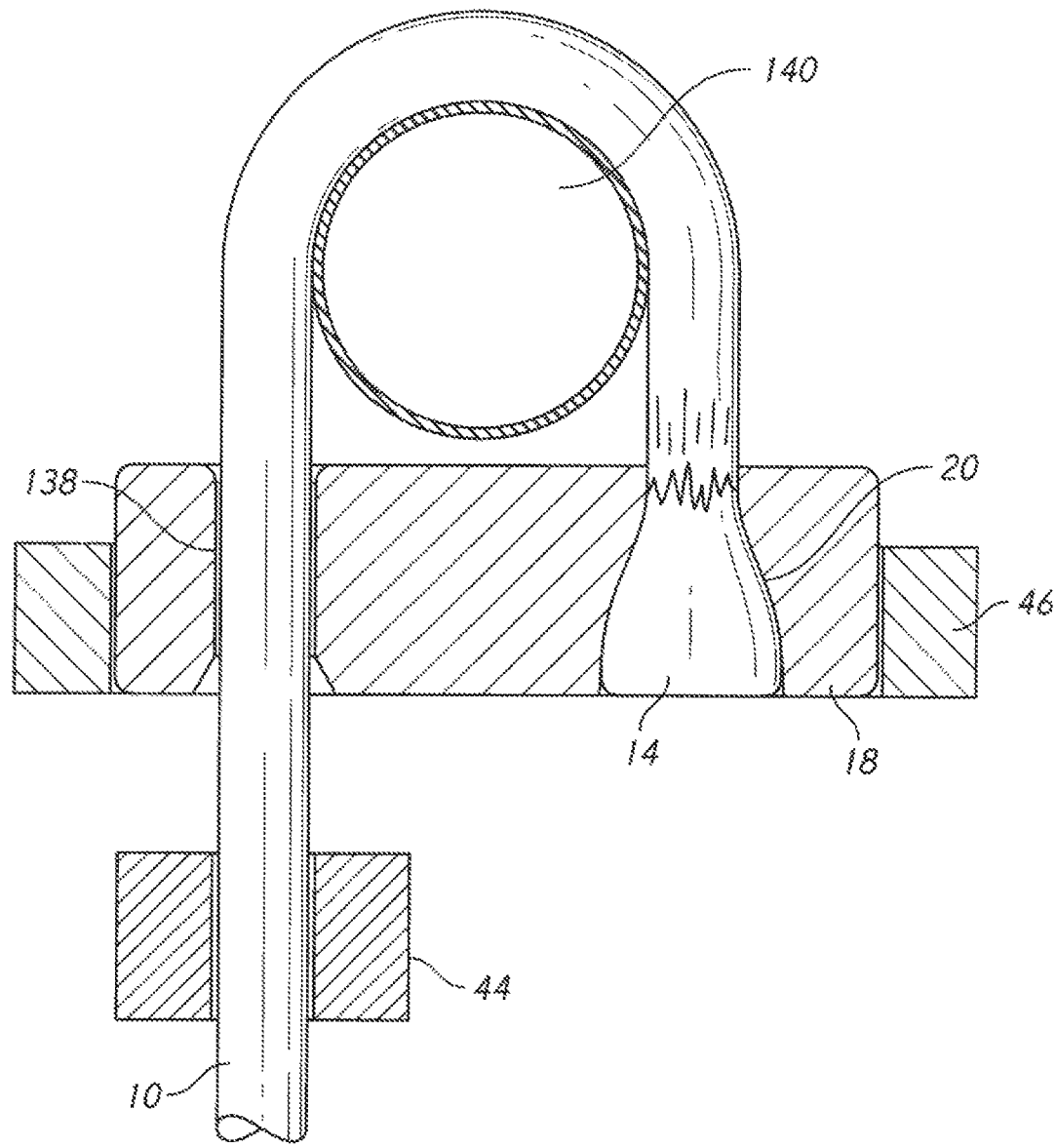
FIG. 26 is a sectional elevation view, showing still another type of anchor and other elements suitable for carrying out the present invention.

FIG. 26 illustrates how the inventive process can be applied to still another type of anchor. Anchor 18 includes passage 138 and cavity 20. This type of anchor is configured to have cable 10 pass through passage 138, around an external component such as bar 140, and then to cavity 20. Potted region 14 is created to lock the free end of the cable into the anchor.

Anchor clamp 46 holds the anchor in position. Cable clamp 44 then applies suitable tension to the cable when the defined transition begins within the potting compound (during the solidification process).

Up to this point in the disclosure, the inventive method has been described as applying to cables having synthetic filaments. The reader should bear in mind that the inventive method can apply to cables having metallic filaments as well. The inventive method can also apply to cables having a hybrid construction, meaning cables comprising both synthetic filaments and metallic filaments (though metallic filaments are more often referred to as strands or wires).

Figure 23:
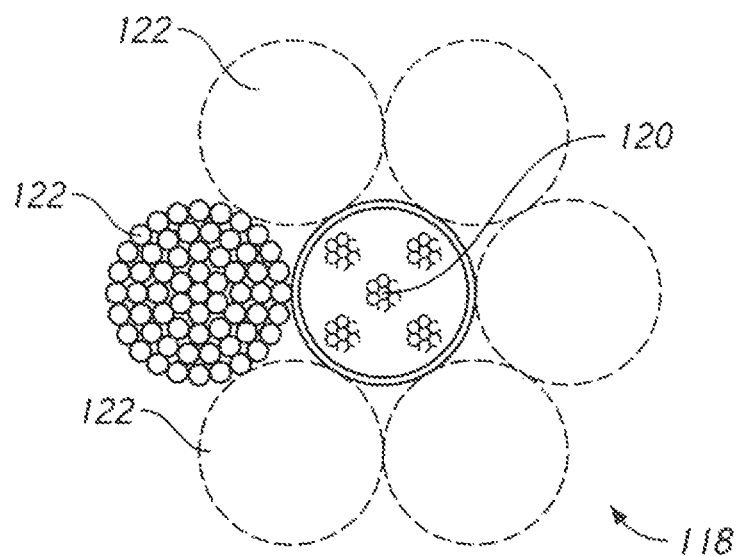
FIG. 23 is a sectional view, showing a hybrid tensile member.
Figure 24:
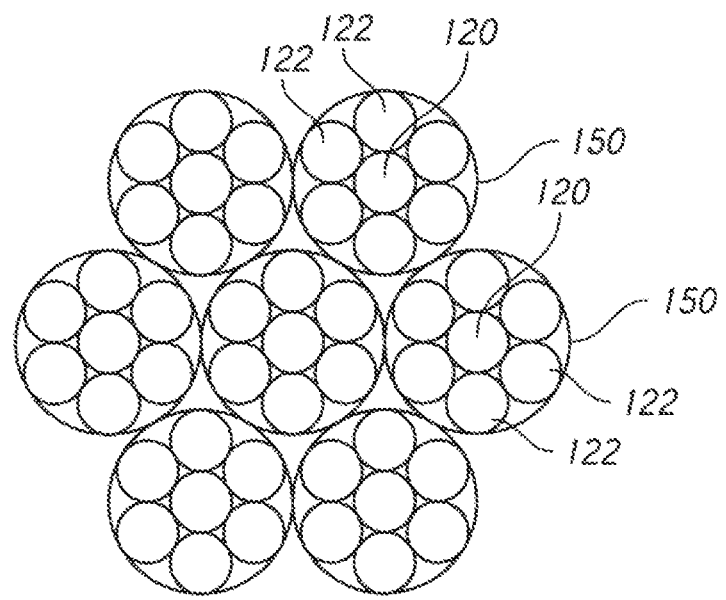
FIG. 24 is a sectional view, showing another type of hybrid tensile member.

FIGS. 23 and 24 provide examples of hybrid tensile members in which include both synthetic and metallic components. Both these figures depict a cross section of a cable. FIG. 23 shows a first exemplary construction in which synthetic core 120 is surrounded by six bundles of wire strands 122 to create hybrid tensile member 118.

FIG. 24 provides an alternate construction. In this embodiment each hybrid strand 150 includes a synthetic core 120 surrounded by wire strands 122.

In both these examples the wire strands may carry a portion of the tensile load. On the other hand, in some instances the wire strands will be present just to provide additional toughness for the assembly as a whole (particular with respect to bending or cutting forces).

The inventive method still provides advantages for these hybrid constructions. This is true where the synthetic elements of a hybrid cable carry a minority of the overall load.

Figure 28:
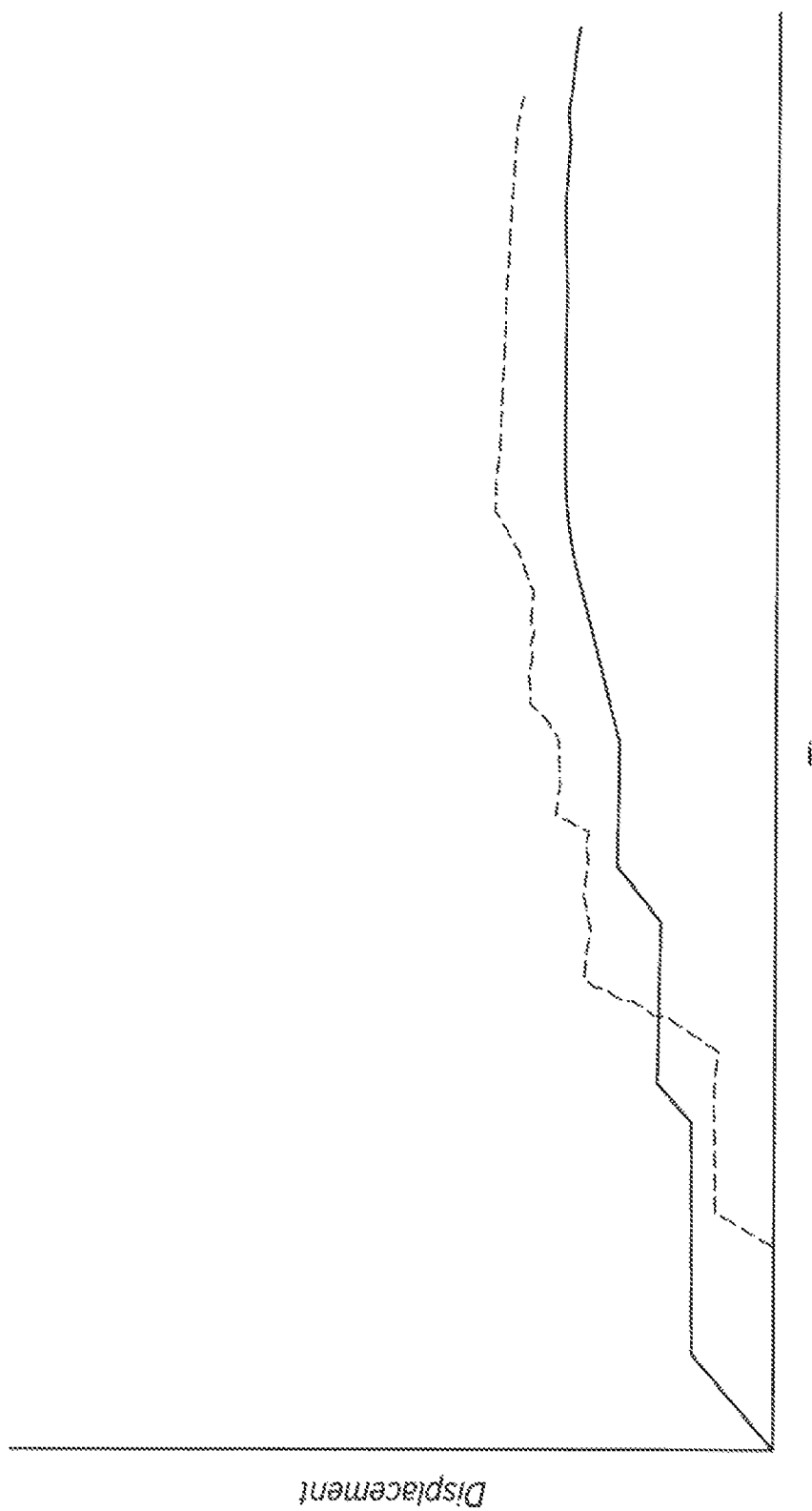
FIG. 28 is a plot of displacement versus time for an embodiment of the inventive method.
Figure 29:
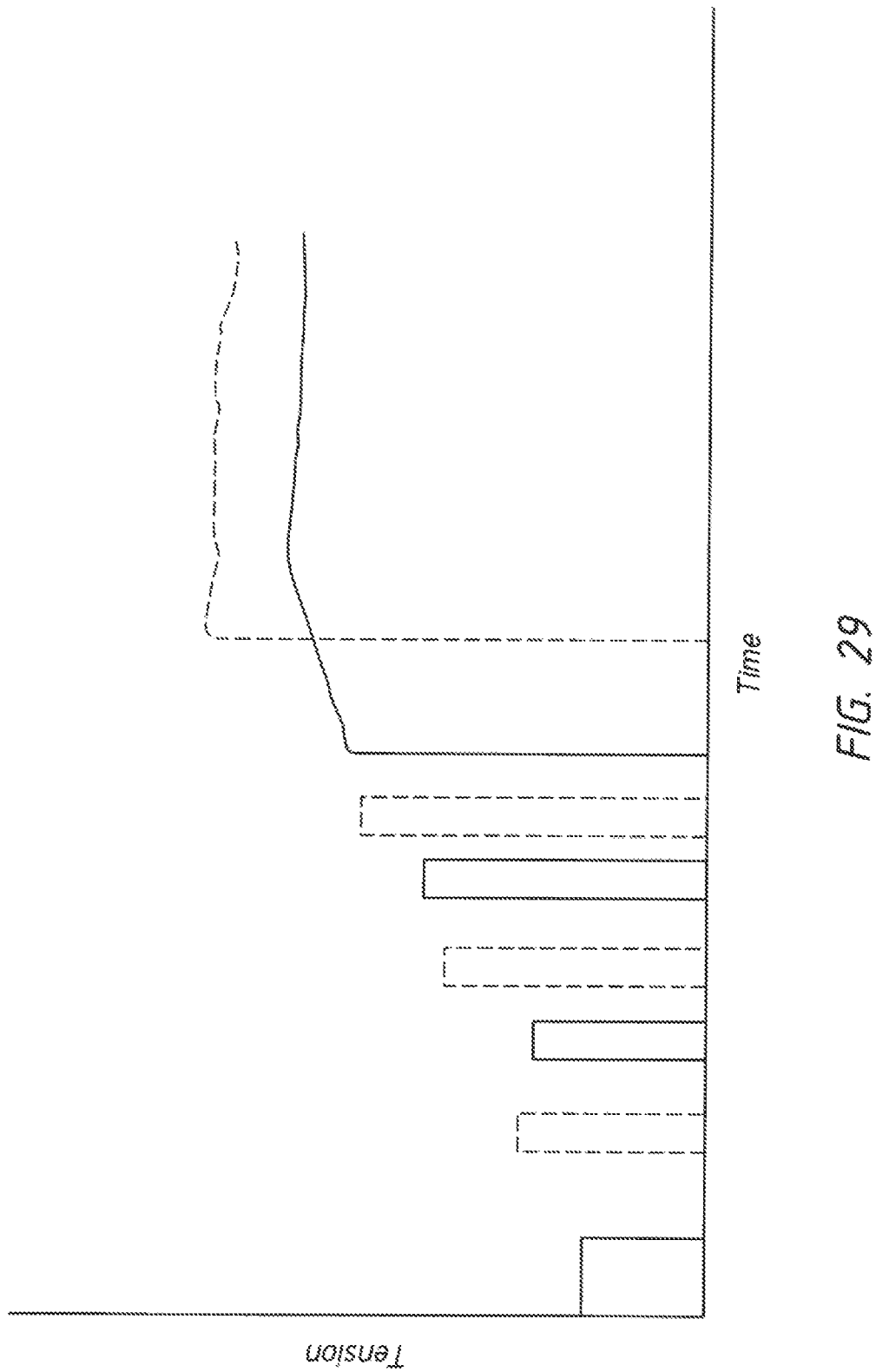
FIG. 29 is a plot of applied tension versus time for an embodiment of the inventive method.

The control process for the application of the potting compound transition tension can assume many forms. FIGS. 28 and 29 provide two examples. FIG. 28 shows a plot of displacement versus time. "Displacement" refers to the linear displacement of a cable or strand in a direction that is approximately parallel to the cable's central axis. The solid line represents one profile and the dashed line represents a second, alternative profile.

In this case a closed-loop control system applies the potting compound transition tension and measures the resulting displacement. The tension is varied in order to produce the displacement curve shown. Alternatively, displacement can be controlled to produce a desired reaction force.

Suitable maxima can be defined for any measured value. As an example, one of the measurements used in a closed loop control system can be the measurement of the translation of the cable (tensile strength member) relative to the anchor. A defined maximum translation can be established. Then, if that defined maximum translation is reached, the applied potting compound transition tension is reduced to the point where all further translation stops.

The ideal goal is not really a pull applied to the centerline of the cable as a whole, but rather a pull that is applied to the centerline of each individual anchor cavity. However, a pull on the centerline of the cable as a whole will often be close enough to the centerline of each individual anchor cavity to produce beneficial and satisfactory results.

FIG. 29 shows a plot of applied potting compound transition tension versus time. The solid line shows one application scheme and the dashed line shows a second, alternative application scheme. The tension can also be regulated by a closed-loop control system monitoring reaction forces. In many cases it is desirable to use both displacement and tension in regulating the control system. As an example, the control system can apply a pulse of tension and measure the resulting displacement. If a high initial displacement rate occurs the control system can reduce the applied tension in response.

The reader should be aware that anywhere an anchor has been illustrated in the preceding embodiments a molded termination can be substituted. In this concept the mold is used to create a compose of solidified potting compound and filaments on a strand. This composite is then placed within a final-use anchor for actual use. The mold may be a separate anchor itself or may be a multi-part complex mold similar to those used in thermoplastic injection molding. Many other variations will occur to those skilled in the art and the invention is not limited to any particular variation. Although the preceding description contains significant detail, it should not be construed as limiting the scope of the invention but rather as providing illustrations of the preferred embodiments of the invention. Those skilled in the art will be able to devise many other embodiments that carry out the present invention. Thus, the language used in the claims shall define the invention rather than the specific embodiments provided.

Having described our invention, we claim:

1. A method for adding a termination to an end of a tensile strength member made up of multiple synthetic filaments, said tensile strength member having a central axis, comprising:
 a. providing an anchor with a proximal end, a distal end, and a cavity;
 b. said cavity including a distal region and a neck region;
 c. providing a potting compound in a liquid state, said potting compound being configured to transition to a solid state over time;
 d. placing a length of said filaments within said cavity;
 e. adding said potting compound in said liquid state to said cavity;
 f. controlling a set of initial conditions in order to ensure repeatability;
 g. determining an optimum time range for an application of a potting compound transition tension; and
 h. during said optimum time range, applying said potting compound transition tension to said tensile strength member.

2. A method for adding a termination to an end of a tensile strength member as recited in claim 1, wherein said optimum time range is determined as a function of potting compound transition delay.

3. A method for adding a termination to an end of a tensile strength member as recited in claim 2, further comprising after said step of applying said potting compound transition tension to said tensile strength member, monitoring a translation of said tensile strength member relative to said anchor and limiting said translation to a defined maximum translation.

4. A method for adding a termination to an end of a tensile strength member as recited in claim 1, further comprising limiting said potting compound transition tension to a defined maximum.

5. A method for adding a termination to an end of a tensile strength member as recited in claim 1, wherein said initial conditions comprise an initial temperature of said potting compound and an initial temperature of said anchor.

6. A method for adding a termination to an end of a tensile strength member as recited in claim 5, wherein said initial conditions further comprise ambient temperature.

7. A method for adding a termination to an end of a tensile strength member including multiple synthetic filaments arranged into multiple strands, including a first strand and a second strand, said tensile strength member having a central axis, said method comprising:
 a. providing an anchor with a first cavity and a second cavity;
 b. providing a potting compound in a liquid state, said potting compound being configured to transition to a solid state over time;

c. placing filaments of said first strand within said first cavity;
d. placing filaments of said second strand in said second cavity;
e. adding said potting compound in said liquid state to said first cavity;
f. adding said potting compound in said liquid state to said second cavity;
g. controlling a set of initial conditions in order to ensure repeatability;
i. determining an optimum time range for an application of a potting compound transition tension; and
j. during said optimum time range, applying said potting compound transition tension to said tensile strength member.

8. A method for adding a termination to an end of a tensile strength member as recited in claim 7 wherein said potting compound transition tension is applied to said tensile strength member as a whole.

9. A method for adding a termination to an end of a tensile strength member as recited in claim 8 wherein said potting compound transition tension is applied via a single-cable clamp that engages said tensile strength member.

10. A method tor adding a termination to an end of a tensile strength member as recited in claim 8 wherein said potting compound transition tension is applied via a first cable clamp that engages said first strand and a second cable clamp that engages said second strand.

11. A method for adding a termination to an end of a tensile strength member as recited in claim 7, wherein said optimum time range is determined as a function of potting compound transition delay.

12. A method for adding a termination to an end of a tensile strength member as recited in claim 7, further comprising after said step of applying said potting compound transition tension to said tensile strength member, monitoring a translation of said tensile strength member relative to said anchor and limiting said translation to a defined maximum translation.

13. A method for adding a termination to an end of a tensile strength member as recited in claim 7, further comprising limiting said potting compound transition tension to a defined maximum.

14. A method for adding a termination to an end of a tensile strength member as recited in claim 7, wherein said initial conditions comprise an initial temperature of said potting compound and an initial temperature of said anchor.

15. A method for adding a termination to an end of a tensile strength member as recited in claim 14, wherein said initial conditions further comprise ambient temperature.

16. A method for adding a termination to an end of a tensile strength member including multiple synthetic filaments arranged into multiple strands, including a first strand, a second strand, and a third strand, said tensile strength member having a central axis, said method comprising:
a. providing an anchor with a first cavity, a second cavity, and a third cavity;
b. providing a potting compound in a liquid state, said potting compound being configured to transition to a solid state over time;
c. placing filaments of said first strand within said first cavity;
d. placing filaments of said second strand in said second cavity;
e. placing filaments of said third strand in said third cavity;
f. adding said potting compound in said liquid state to said first cavity;
g. adding said potting compound in said liquid state to said second cavity;
h. adding said potting compound in said liquid state to said third cavity;
i. controlling a set of initial conditions in order to ensure repeatability;
j. determining an optimum time range for an application of a potting compound transition tension; and
k. during said optimum time range, applying said potting compound transition tension to said tensile strength member.

17. A method for adding a termination to an end of a tensile strength member as recited in claim 16 wherein said potting compound transition tension is applied to said tensile strength member as a whole.

18. A method for adding a termination to an end of a tensile strength member as recited in claim 17 wherein said potting compound transition tension is applied via a single cable clamp that engages said tensile strength member.

19. A method for adding a termination to an end of a tensile strength member as recited in claim 16 wherein said potting compound transition tension is applied via a first cable clamp that engages said first strand, a second cable clamp that engages said second strand, and a third cable clamp that engages said third strand.

20. A method for adding a termination to an end of a tensile strength member as recited in claim 16, wherein said optimum time range is determined as a function of potting compound transition delay.

21. A method for adding a termination to an end of a tensile strength member as recited in claim 16, further comprising after said step of applying said potting compound transition tension to said tensile strength member, monitoring a translation of said tensile strength member relative to said anchor and limiting said translation to a defined maximum translation.

22. A method for adding a termination to an end of a tensile strength member as recited in claim 16, wherein said initial conditions comprise an initial temperature of said potting compound and an initial temperature of said anchor.

23. A method for adding a termination to an end of a tensile strength member as recited in claim 16, further comprising limiting said potting compound transition tension to a defined maximum.

* * * * *